United States Patent
Takahashi et al.

(10) Patent No.: US 8,433,493 B2
(45) Date of Patent: Apr. 30, 2013

(54) VEHICLE MOTION CONTROL SYSTEM

(75) Inventors: Junya Takahashi, Saitama (JP); Makoto Yamakado, Tsuchiura (JP); Toshiya Oosawa, Yokohama (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/535,747

(22) Filed: Jun. 28, 2012

(65) Prior Publication Data

US 2012/0277965 A1    Nov. 1, 2012

(30) Foreign Application Priority Data

Jul. 1, 2011    (JP) ................................. 2011-147748

(51) Int. Cl.
*G06F 7/70* (2006.01)

(52) U.S. Cl.
USPC ............................................................ 701/70

(58) Field of Classification Search .................... None
See application file for complete search history.

(56) References Cited

U.S. PATENT DOCUMENTS

| | | | |
|---|---|---|---|
| 2008/0294321 | A1 | 11/2008 | Yamakado et al. |
| 2009/0037064 | A1 | 2/2009 | Nakamura et al. |
| 2009/0102145 | A1 | 4/2009 | Moriki et al. |
| 2009/0192675 | A1 | 7/2009 | Yamakado et al. |

FOREIGN PATENT DOCUMENTS

| | | |
|---|---|---|
| JP | 2008-285066 A | 11/2008 |
| JP | 2008-290469 A | 12/2008 |
| JP | 2009-51487 A | 3/2009 |
| JP | 2009-113792 A | 5/2009 |
| JP | 2010-260544 A | 11/2010 |
| JP | 2011-73534 A | 4/2011 |
| JP | 2011-88576 A | 5/2011 |
| JP | 2011-157067 A | 8/2011 |

OTHER PUBLICATIONS

Junya Takahashi et al., "A Study on an Acceleration/Deceleration Model Based on Time Variation of Road Curvature Ahead of a Running Vechicle", Society of Automotive Engineers of Japan, Inc., First International Symposium on Future Active Safety Technology toward zero-traffic-accident, 2011, (six (6) pages).

(Continued)

*Primary Examiner* — Thomas Tarcza
*Assistant Examiner* — Adam Alharbi
(74) *Attorney, Agent, or Firm* — Crowell & Moring LLP

(57) ABSTRACT

There is provided a vehicle motion control system which carries out acceleration and deceleration of a vehicle which satisfies driving feeling of a driver even in the state where a lateral motion of the vehicle is not involved. The vehicle motion control system includes a curve shape acquisition section 2 for acquiring a curve shape ahead of an own vehicle, an own vehicle position acquisition section 3 for acquiring a position of the own vehicle, and a vehicle motion control calculation section 4 for calculating a command value of a longitudinal acceleration generated for the vehicle based on the curve shape and the position of the own vehicle. The vehicle motion control calculation section 4 calculates a plurality of negative longitudinal acceleration command values during travel of the own vehicle from before a curve to a point where a curve curvature becomes constant or maximum after the vehicle enters into the curve. The longitudinal acceleration command values are changed based on at least one of: an estimate of the maximum lateral acceleration which is presumably generated during traveling a curve ahead of the own vehicle; a grade of the road ahead of the own vehicle, pedal operation by the driver, and a turning direction.

15 Claims, 23 Drawing Sheets

OTHER PUBLICATIONS

Junya Takahasi et al., "An Evaluation of Preview G-Vectoring Control Which Decelerates the Vehicle Prior to Entry into a Curve", Proceedings /Manuscripts of Technical Paper Presentations Society of Automotive Engineers of Japan, No. 145-11, 2011, pp. 7-12.

M. Yamakado et al., "Understanding and Evaluation of Driver and Vehicle Dynamic Characteristics Based Upon Jerk Information—An Investigation of Longitudinal and Lateral Integrated Control", Transactions of Society of Automotive Engineers of Japan, vol. 39, No. 3, 2008, pp. 47-52.

Maximum lateral acceleration estimate $G_{ymaxEST}$ (a) When longitudinal acceleration command value is negative (b) When longitudinal acceleration command value is positive (a) When longitudinal acceleration command value is negative (b) When longitudinal acceleration command value is positive

VEHICLE MOTION CONTROL SYSTEM

BACKGROUND OF THE INVENTION

1. Field of the Invention

The present invention relates to vehicle motion control systems, and more particularly to a vehicle motion control system for accelerating or decelerating a vehicle so that the vehicle has an adequate motion state.

2. Background Art

Conventionally, a system has been known which decelerates a vehicle when lateral acceleration generated on the vehicle becomes larger than a set value based on curve information of a navigation system or a lateral acceleration at the time of turning (see, for example, JP Patent Publication (Kokai) No. 2009-51487).

In such a system, a target vehicle speed at the time of driving a curve is set from a preset lateral acceleration set value and a curve curvature ahead of an own vehicle so that the magnitude of a lateral acceleration generated at the time of passing the curve is not more than the set value. A necessary deceleration is produced based on both of the target vehicle speed and an actual vehicle speed. Producing the deceleration in such a way is effective for suppressing departure from a road when the vehicle enters into a curve at a speed exceeding a limit speed at which the vehicle can turn the curve.

However, when deceleration control before a curve is performed by setting as the set lateral acceleration not a turnable lateral acceleration limit but a lateral acceleration that a driver can presumably tolerate at normal turning, it is not necessarily assured that the performed deceleration sufficiently corresponds to a sensory deceleration of the driver. This may partly be attributed to the fact that in the aforementioned method for producing the deceleration based on the target vehicle speed, the total deceleration before entering into the curve (deceleration integral value) can be defined but a temporal change of the deceleration cannot be defined.

If deceleration control is carried out so that the deceleration before curves is constant, the performed deceleration may not sufficiently correspond to a sensory deceleration of the driver depending on curves and vehicle speeds. Setting a temporal change of the deceleration for every curve requires a large number of adaptation steps and a vast quantity of data.

As a method for defining the temporal change of the acceleration and deceleration which sufficiently corresponds to a sensory deceleration of the driver, a method for producing acceleration and deceleration based on a lateral jerk generated by operation of the driver has been proposed (see, for example, JP Patent Publication (Kokai) No. 2008-285066 and Transactions of Society of Automotive Engineers of Japan, Vol. 39, No. 3, 2008). This method makes it possible to carry out acceleration and deceleration in the same way as by skilled drivers without setting the temporal change of the deceleration for every curve.

SUMMARY OF THE INVENTION

However, the acceleration and deceleration production method based on the lateral jerk is a method for producing acceleration and deceleration in association with a lateral motion which is generated in the vehicle. Consequently, it is impossible to set the deceleration in the state where the lateral motion of the vehicle is not involved as seen in the case of the deceleration in a straight road before entering into a curve, for example.

In view of the foregoing problems, an object of the present invention is to provide a vehicle motion control system which carries out acceleration and deceleration of a vehicle which satisfies driving feeling of the driver even in the state where a lateral motion of the vehicle is not involved.

In order to accomplish the above object, a vehicle motion control system according to the present invention includes: a curve shape acquisition section for acquiring a curve shape ahead of an own vehicle; an own vehicle position acquisition section for acquiring a position of the own vehicle; a vehicle motion control calculation section for calculating a command value of longitudinal acceleration generated for the vehicle based on the curve shape and the position of the own vehicle; wherein with respect to the longitudinal acceleration command value having a travelling direction of the own vehicle as a positive value, the vehicle motion control calculation section calculates a negative longitudinal acceleration command value during travel of the own vehicle from before a curve to a point where a curve curvature becomes constant or maximum after the vehicle enters into the curve, and changes the longitudinal acceleration command value based on at least one out of: an estimate of a maximum lateral acceleration which is calculated in advance by the vehicle motion control calculation section and which is presumably generated at a time of traveling a curve ahead of the own vehicle; a grade of a road ahead of the own vehicle; pedal operation by a driver; and a turning direction.

According to the present invention, it becomes possible to provide a vehicle motion control system which carries out acceleration and deceleration of a vehicle which satisfies driving feeling of the driver even in the state where a lateral motion of the vehicle is not involved.

Objects, configurations and effects other than those in the foregoing description will become apparent in the following description of the embodiments.

DETAILED DESCRIPTION OF THE PREFERRED EMBODIMENTS

Hereinafter, embodiments of the vehicle motion control system according to the present invention will be described with reference to the drawings.

Figure 1:
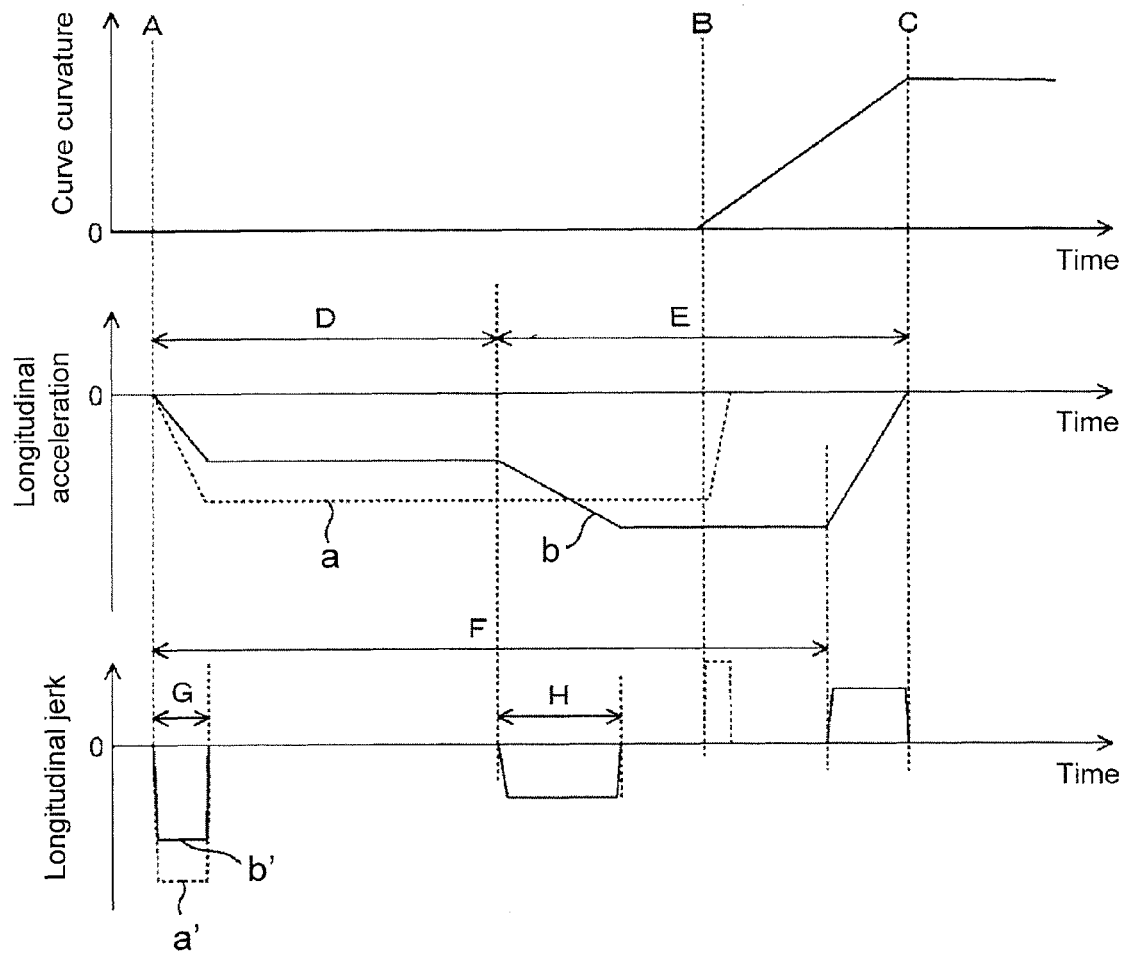
FIG. 1 is a concept view showing a longitudinal acceleration change and a longitudinal jerk change before a curve in a vehicle of a vehicle motion control system according to the present invention.

FIG. 1 is a concept view showing a longitudinal acceleration change and a longitudinal jerk change of a vehicle before a curve according to a vehicle motion control system in the embodiment of the present invention.

Lines b and b' in FIG. 1 respectively show the longitudinal acceleration change and the longitudinal jerk change according to the vehicle motion control system of the present embodiment. Lines a and a' in FIG. 1 respectively show a longitudinal acceleration change and a longitudinal jerk change according to a conventional technology.

As shown in FIG. 1, in the conventional technology, a deceleration is constant during a period of time from time A when a vehicle has arrived at a certain point before a curve to time B when the vehicle starts to enter into the curve. As a result, under the condition of a high vehicle speed, a high deceleration might be generated before a driver clearly recognizes the degree of a curve curvature. This may give the driver the impression that an excessive deceleration was conducted before the curve even though the vehicle reached a predetermined lateral acceleration at the time of turning.

In the present embodiment, the longitudinal acceleration changes during a period from time A to time C when the curve curvature becomes constant. A deceleration based on the curve curvature in a section D where an own vehicle position is at a distance from the curve shifts to a deceleration based on a temporal change of the curve curvature in a section E where the own vehicle position is in the vicinity of the curve. As a result, change of the longitudinal jerk occurs in two sections G and H which are included in a section F where the deceleration starts and becomes a maximum. The section G is immediately after start of the deceleration and the section H is in the vicinity of the curve where deceleration shift occurs.

Accordingly, the deceleration performed at a distance from the curve based on the recognition of the driver that "deceleration is necessary because of the curve" can be shifted to the deceleration according to a temporal change of the curve curvature, which is achieved by the driver recognizing the curvature change of the curve in the vicinity of the curve and concluding that "more deceleration is necessary because the curvature change is large." This makes it possible to implement the deceleration which satisfies driving feeling of the driver.

(Method for Calculating Longitudinal Acceleration Command Value Based on Curve Curvature and Curve Curvature Change)

Figure 2:
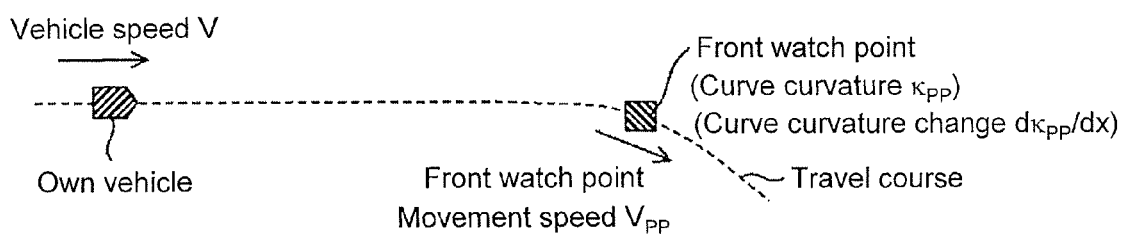
FIG. 2 is a concept view showing the relation between an own vehicle and a front watch point in the vehicle motion control system according to the present invention.

Before a description of the embodiments, a method for calculating a longitudinal acceleration command value (a command value of longitudinal acceleration) based on a curve curvature and a curve curvature change is hereinafter explained with reference to FIGS. 2 to 5 for easy understanding of the present invention. In this specification, the longitudinal acceleration is described with the acceleration side taking a positive value while the deceleration side taking a negative value. The longitudinal deceleration is described with the deceleration side taking a positive value. As shown in FIG. 2, a scene is considered in which an own vehicle travels at a vehicle speed V on a travel course shown with a broken line. In this case, the driver is presumed to perform acceleration and deceleration by observing the geography of the travel course ahead of the own vehicle. A front watch point is set in a travelling direction of the own vehicle as a virtual point representing the point that the driver watches at this point. A curve curvature and a curve curvature change at this position are each set as $\kappa_{PP}$ and $d\kappa_{PP}/dx$. Here, the front watch point is a point which is on the course ahead of the own vehicle and which is away from the own vehicle by a certain distance $L_{pp}$. The distance $L_{pp}$ is a value obtained by integrating a preset time $T_{pp}$ to the vehicle speed V. The curve curvature $\kappa_{PP}$ takes a value of 0 or more regardless of the direction of the curve. When a curve curvature radius is large enough, the curve curvature $\kappa_{PP}$ is set to 0. Assuming that the vehicle goes into the position of the front watch point while keeping the vehicle speed V, a presumably-generated lateral acceleration estimate $G_{yEST}$ and a lateral jerk estimate $dG_{yEST}$ that is a temporal change of the lateral acceleration are each provided by the following Formulas (1) and (2). The lateral acceleration estimate $G_{yEST}$ constantly takes a value of 0 or more regardless of right turn or left turn as shown in Formula (1).

$$G_{yEST} = \kappa_{PP} \cdot V^2 \tag{1}$$

$$dG_{yEST} = \frac{d\kappa_{PP}}{dt} \cdot V^2 + \kappa_{PP} \cdot 2V \cdot \frac{dV}{dt} \tag{2}$$

Under the condition that the own vehicle is positioned in the vicinity of the curve and a distance from the vehicle to the front watch point is short, it is assumed that the driver performs acceleration and deceleration with the same algorithm as in the aforementioned method for creating acceleration and deceleration based on the lateral jerk (JP Patent Publication (Kokai) No. 2008-285066, and Transactions of Society of Automotive Engineers of Japan, Vol. 39, No. 3, 2008). Consequently, a longitudinal acceleration command value $G_{xREQ}$ based on the lateral jerk estimate $dG_{yEST}$ is provided by Formula (3) shown below.

$$G_{xREQ} = -C_{xy} \cdot dG_{yEST} \tag{3}$$

In this formula, $C_{xy}$ is a proportional gain, which is a value variable according to parameters such as a maximum lateral acceleration estimate (an estimate of a maximum lateral acceleration), a road grade at the front watch point and the pedal operation by the driver. A method for setting the proportional gain will be described later. Since the influence of a second term ($\kappa_{PP} \cdot 2V \cdot dV/dt$) of Formula (2) is small enough as compared with a first term ($d\kappa_{PP}/dt \cdot V^2$), following Formula (4) is obtained by substituting Formula (2) into Formula (3).

$$G_{xREQ} = -C_{xy} \cdot \frac{d\kappa_{PP}}{dt} \cdot V^2 \tag{4}$$

Thus, the longitudinal acceleration command value based on the temporal change of the curve curvature ($d\kappa_{PP}/dt$) at the front watch point is obtained. Further, the term ($d\kappa_{PP}/dt$) can be deformed into Formula (5).

$$\frac{d\kappa_{PP}}{dt} = \frac{d\kappa_{PP}}{dx} \cdot \frac{dx}{dt} \tag{5}$$

In this formula, since (dx/dt) is a movement speed $V_{PP}$ of the front watch point, Formula (4) is provided by the following Formula (6) with use of $V_{PP}$.

$$G_{xREQ} = -C_{xy} \cdot \frac{d\kappa_{PP}}{dx} \cdot V_{PP} \cdot V^2 \tag{6}$$

Accordingly, the longitudinal acceleration command value in the vicinity of the curve can be created.

Figure 3:
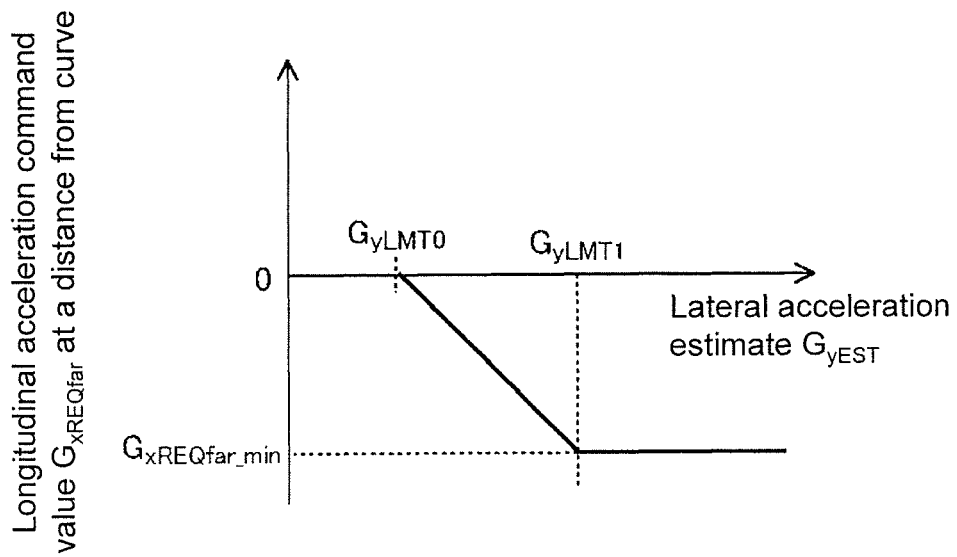
FIG. 3 is a view showing the relation between a lateral acceleration estimate and a longitudinal acceleration command value at a distance from a curve in the vehicle motion control system according to the present invention.

In the case where the own vehicle is positioned at a distance from the curve and a distance from the vehicle to the front watch point is long, it is presumed that the driver cannot get detailed information such as a curve curvature change and therefore performs deceleration with reference to a vague curve curvature. A longitudinal acceleration command value $G_{xREQfar}$ in this case may be created with use of the lateral acceleration estimate $G_{yEST}$ obtained by the aforementioned Formula (1) as shown in FIG. 3 for example. In this case, according to the lateral acceleration estimate $G_{yEST}$, the longitudinal acceleration command value $G_{xREQfar}$ is decreased (the deceleration is increased) to a minimum value $G_{xREQfar\_min}$ in a range from certain lateral acceleration set values $G_{yLMT0}$ to $G_{yLMT1}$. The longitudinal acceleration command value $G_{xREQfar}$ may also be given by the following Formula (7) where $L_{far}$ represents a distance from the own vehicle to a distant front watch point and $G_{ySET}$ represents a certain set lateral acceleration. In this formula, min(A, B) is a function to select either smaller one of A or B, and max(A, B) is a function to select either larger one of A or B.

$$G_{xREQfar} = \max\left(\min\left(C_x \cdot \frac{(G_{ySET}/\kappa_{PP}) - V^2}{2 \cdot L_{far}}, 0\right), G_{xREQfar\_min}\right) \tag{7}$$

In this formula, $L_{far}$ may be a preset value or a value obtained by integrating a preset time $T_{pp}$ to a vehicle speed V as long as it is equal to or more than the value of $L_{pp}$. Moreover, $G_{ySET}$ and $G_{xREQfar\_min}$ may be preset values or values variable according to a road surface friction coefficient or a value set by the driver when the system includes a road surface friction coefficient acquisition means and a driver setting means.

Moreover, $C_x$ may be a preset value or a value variable according to parameters such as a maximum lateral acceleration estimate, a road grade at the front watch point and pedal operation by the driver. Although the method for creating $G_{xREQfar}$ is not limited to the methods disclosed, the deceleration based on the longitudinal acceleration command value $G_{xREQfar}$ should be created to be equal to or less than the deceleration based on the longitudinal acceleration $G_{xREQ}$ in the vicinity of the curve.

Based on the thus-obtained longitudinal acceleration command values in the vicinity of the curve and at a distance from the curve, a final longitudinal acceleration command value is created. Consequently, it becomes possible to generate the longitudinal acceleration that increases the deceleration from a deceleration based on the curve curvature at a distance from the curve (section D) to a deceleration based on the curve curvature change in the vicinity of the curve (section E) as shown in FIG. 1b.

Figure 4:
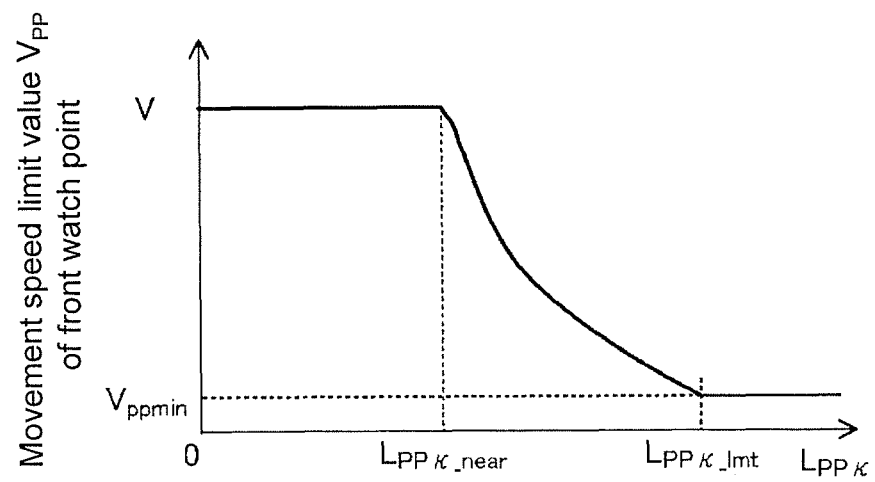
FIG. 4 is a view showing the relation between a distance to a front watch point and a movement speed of the front watch point in the vehicle motion control system according to the present invention.

Moreover, instead of creating separate longitudinal acceleration commands for the case where the own vehicle is positioned in the vicinity of the curve and for the case where the own vehicle is positioned at a distance from the curve, the movement speed $V_{PP}$ of the front watch point in Formula (6) may be changed in proportion to a distance to the curve, so that the deceleration in the case of the own vehicle being positioned at a distance from the curve is changed to the deceleration in the case of the own vehicle being positioned in the vicinity of the curve. For example, when the curve curvature $\kappa_{PP}$ at the front watch point becomes a certain value $\kappa_{PPlmt}$ or more, the movement speed $V_{PP}$ of the front watch point is set to be $V_{PPmin}$ in an area where the front watch distance $L_{pp\kappa}$ is larger than $L_{pp\kappa\_lmt}$ as shown in FIG. 4. The movement speed $V_{PP}$ of the front watch point is increased as the own vehicle approaches a curve and the front watch distance $L_{pp\kappa}$ becomes smaller so that the vehicle reaches the vehicle speed V in the front watch distance $L_{pp\kappa\_near}$.

Here, $L_{pp\kappa\_lmt}$ and $L_{pp\kappa\_near}$ are values preset so that $L_{pp\kappa\_lmt}$ is equal to or more than $L_{pp\kappa\_near}$ and $V_{PPmin}$ is 0 or more and is equal to or less than the vehicle speed V.

These parameters represent the behavior of a visual line of the driver in the form of a movement speed of the front watch point. That is, when the own vehicle is positioned at a distance from the curve and the driver vaguely recognizes the curve, the movement speed of the visual line of the driver is low, whereas when the own vehicle is near the curve, the movement speed of the visual line of the driver increases as the driver tends to move his/her visual line along the curve.

Figure 5:
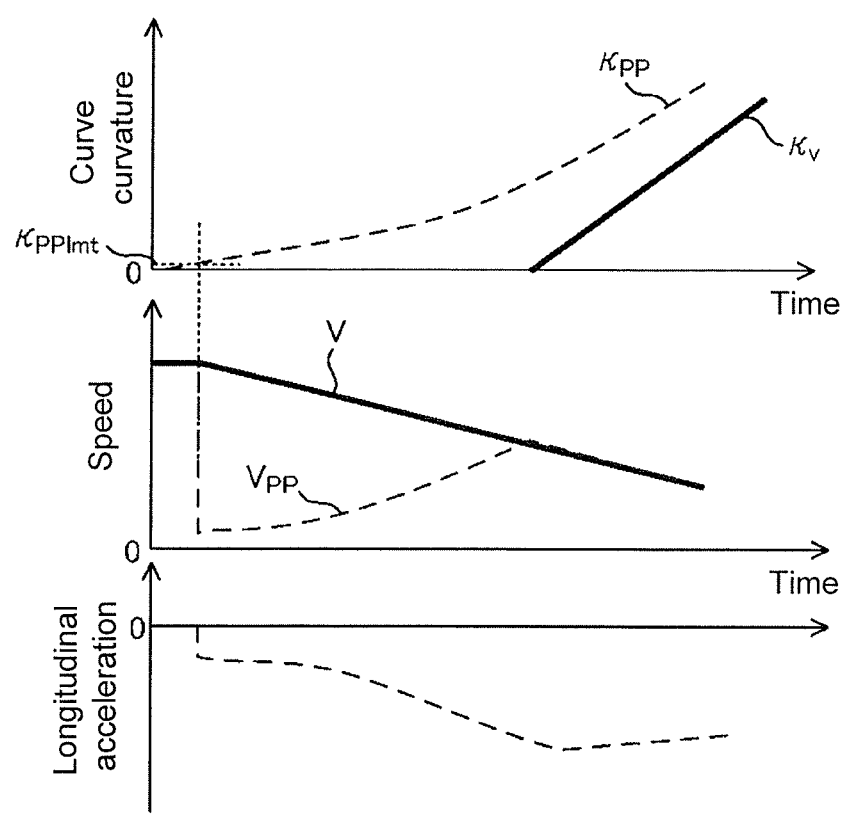
FIG. 5 is a view showing a temporal change of a curve curvature, a speed, and a longitudinal acceleration in the vehicle motion control system according to the present invention.

Accordingly, when the vehicle travels the course in which the curve curvature at the own vehicle position as shown in FIG. 5 is $\kappa_v$, the curve curvature $\kappa_{PP}$ at the front watch point and the movement speed $V_{PP}$ of the front watch point change as shown in FIG. 5. As a result, the deceleration which is small at a distance from the curve can gradually be increased toward the curve.

(Setting Proportional Gain in Longitudinal Acceleration Command Value)

The aforementioned proportional gains $C_{xy}$ and $C_x$ change based on at least one of: an estimate of the maximum lateral acceleration which is presumably generated during traveling a curve ahead of the own vehicle; a grade of the road ahead of the own vehicle, pedal operation by a driver, and a turning direction. Hereinafter, the setting method thereof will be explained with reference to FIGS. 6 to 15.

Figure 6:
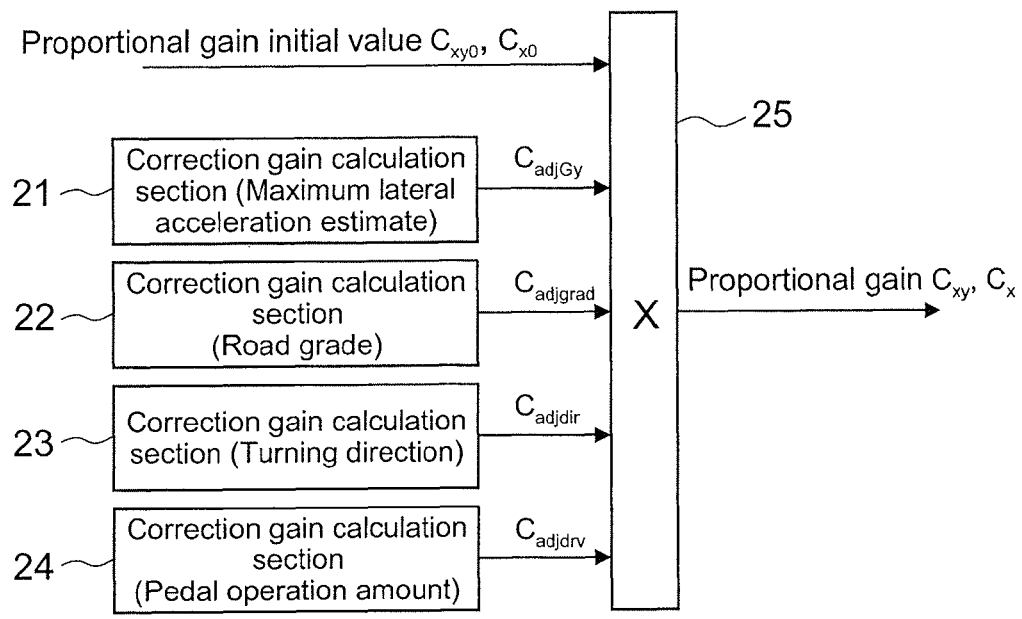
FIG. 6 is a block diagram showing a method for correcting a proportional gain in the vehicle motion control system according to the present invention.

FIG. 6 shows a block diagram for calculating the proportional gains $C_{xy}$ and $C_x$. The proportional gains $C_{xy}$ and $C_x$ are calculated by integrating respective correction gains to proportional gain initial values $C_{xy0}$ and $C_{x0}$. Hereinafter, the method for calculating the correction gains based on the maximum lateral acceleration estimate, the road grade, the pedal operation, and the turning direction will be explained.

Figure 7:
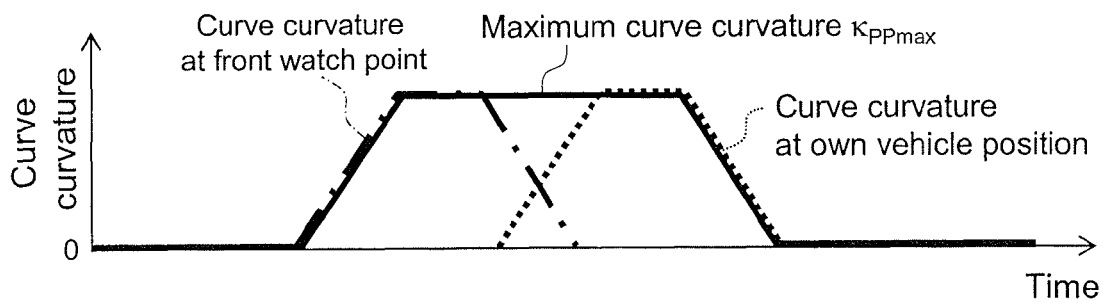
FIG. 7 is a view showing a method for creating a maximum curve curvature in the vehicle motion control system according to the present invention.

First, a correction gain calculation section (maximum lateral acceleration estimate) 21 calculates a correction gain $C_{adjGy}$ based on a maximum lateral acceleration estimate $G_{ymaxEST}$. The maximum lateral acceleration estimate $G_{ymaxEST}$ is given by the following Formula (8) with use of a curve curvature maximum $\kappa_{PPmax}$, which is created from a curve curvature at the front watch point and a curve curvature at the own vehicle position, and a vehicle speed V as shown in FIG. 7.

$$G_{y\,max\,EST} = \kappa_{PPmax} \cdot V^2 \quad (8)$$

Figure 8:
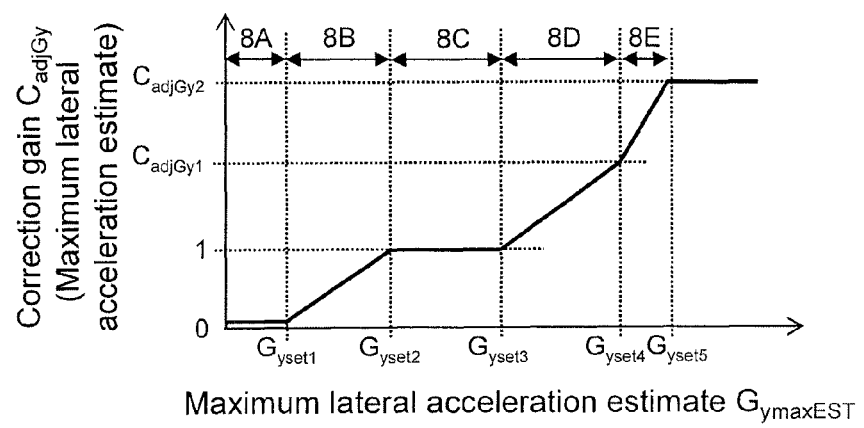
FIG. 8 is a view showing the relation between a maximum lateral acceleration estimate and a correction gain $C_{adjGy}$ in the vehicle motion control system according to the present invention.

Based on the maximum lateral acceleration estimate $G_{ymaxEST}$ obtained by the Formula (8), the correction gain $C_{adjGy}$ is given in the form shown in FIG. 8. In FIG. 8, $G_{yset1}$, $G_{yset2}$, $G_{yset3}$, $G_{yset4}$ and $G_{yset5}$, as well as $C_{adjGy1}$ and $C_{adjGy2}$ are values set to be $0 \leq G_{yset1} < G_{yset2} < G_{yset3} < G_{yset4} \leq G_{yset5}$, and $1 < C_{adjGy1} \leq C_{adjGy2}$. These values may be preset values, values set according to input by the driver himself/herself, or values set according to the maximum lateral acceleration that can be generated for the vehicle when the system has a means to acquire the maximum lateral acceleration that can be generated for the vehicle.

Appropriately setting the values of $G_{yset1}$, $G_{yset2}$, $G_{yset3}$, $G_{yset4}$, $G_{yset5}$, $C_{adjGy1}$ and $C_{adjGy2}$ makes it possible to create an area 8A where the correction gain $C_{adjGy}$ is set to 0 if the maximum lateral acceleration estimate $G_{ymaxEST}$ is small, areas 8B, 8D and 8E where the correction gain $C_{adjGy}$ increases in response to the increase in the maximum lateral acceleration estimate $G_{ymaxEST}$, and an area 8C where the correction gain $C_{adjGy}$ is set to 1 if the maximum lateral acceleration estimate $G_{ymaxEST}$ is in a certain range. Accordingly, in the area where the maximum lateral acceleration estimate $G_{ymaxEST}$ is small, correction can be implemented by setting the correction gain $C_{adjGy}$ to be less than 1 so as to decrease an absolute value of the longitudinal acceleration command value. Correction is not performed when the maximum lateral acceleration estimate $G_{ymaxEST}$ is in a certain range. In the area where the maximum lateral acceleration estimate $G_{ymaxEST}$ is large, correction can be implemented by setting the correction gain $C_{adjGy}$ to be more than 1 so as to increase the absolute value of the longitudinal acceleration command value. Moreover, in the area (area 8E in FIG. 8) where the maximum lateral acceleration estimate $G_{ymaxEST}$ is extremely large, the increase in correction gain $C_{adjGy}$ is made larger than the increase in maximum lateral acceleration estimate $G_{ymaxEST}$, so that the absolute value of the longitudinal acceleration command value can be further increased in such a scene where the vehicle departs from a road after entering into the curve as deceleration was not performed before the curve.

The method for setting the correction gain $C_{adjGy}$ with respect to the maximum lateral acceleration estimate $G_{ymaxEST}$ is not limited to the method shown in FIG. 8. Any method can be adopted which can provide areas where the correction gain $C_{adjGy}$ becomes 0 to 1, becomes 1, and becomes more than 1 with respect to the increase in the maximum lateral acceleration estimate $G_{ymaxEST}$. Accordingly, the magnitude of the longitudinal acceleration command value created in the aforementioned Formula (6) can be changed according to the lateral acceleration.

Figure 9:
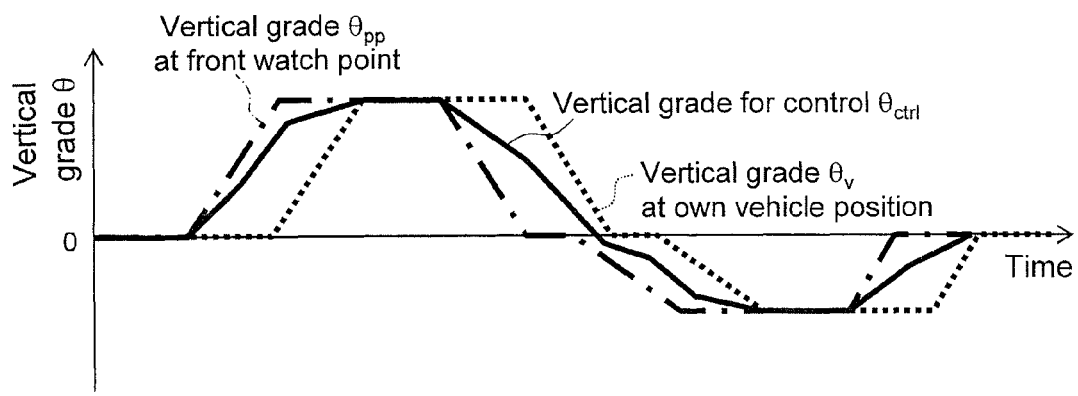
FIG. 9 is a view showing a method for creating a vertical grade for control in the vehicle motion control system according to the present invention.

Next, a correction gain calculation section (road grade) 22 calculates a correction gain $C_{adjgrad}$ based on the road grade. When a vertical grade such as an ascending slope and a descending slope is used as a road grade, a vertical grade for control $\theta_{ctrl}$ is created from a vertical grade $\theta_{pp}$ at the front watch point and a vertical grade $\theta_v$ at the own vehicle position to calculate the correction gain $C_{adjgrad}$ as shown in FIG. 9. In this case, θ is a variable which is positive in an ascending grade and negative in a descending grade. Creation of $\theta_{ctrl}$ is made by filtering a value calculated by the following Formula (9) with use of the vertical grade $\theta_{pp}$ at the front watch point and the vertical grade $\theta_v$ at the own vehicle position. In this formula, $k_{grad}$ is a constant which takes a value in the range of 0 to 1 in order to change the weight of the vertical grade $\theta_{pp}$ at the front watch point and the vertical grade $\theta_v$ at the own vehicle position. It is to be noted $k_{grad}$ may be a preset value or a value variable according to the vertical grade $\theta_{pp}$ at the front watch point and the vertical grade $\theta_v$ at the own vehicle position. For example, $k_{grad}$ may take different values in the case where both $\theta_{pp}$ and $\theta_v$ are positive and in the case where $\theta_{pp}$ is negative and $\theta_v$ is positive. When $\theta_{pp}$ is negative, $k_{grad}$ may take a value larger than that in the case where $\theta_{pp}$ is positive.

$$\theta_{ctrl} = \theta_V + (\theta_{PP} - \theta_V) \cdot k_{grad} \quad (9)$$

The correction gain $C_{adjgrad}$ is given in the form shown in FIG. 10 with use of the $\theta_{ctrl}$ obtained in the Formula (9). In FIG. 10, $\theta_{seta1}$, $\theta_{seta2}$, $\theta_{seta3}$, $\theta_{seta4}$, $\theta_{setb1}$, $\theta_{setb2}$, $\theta_{setb3}$ and $\theta_{setb4}$, as well as $C_{adjgrada1}$ and $C_{adjgradb1}$ are values set so that $\theta_{seta1} < \theta_{seta2} < 0 < \theta_{seta3} < \theta_{seta4}$, $0 < C_{adjgrada1}$, $\theta_{setb1} < \theta_{setb2} < 0 < \theta_{setb3} < \theta_{setb4}$, and $0 < C_{adjgradb1}$. These values may be preset values or values set corresponding to input by the driver himself/herself.

Figure 10A:
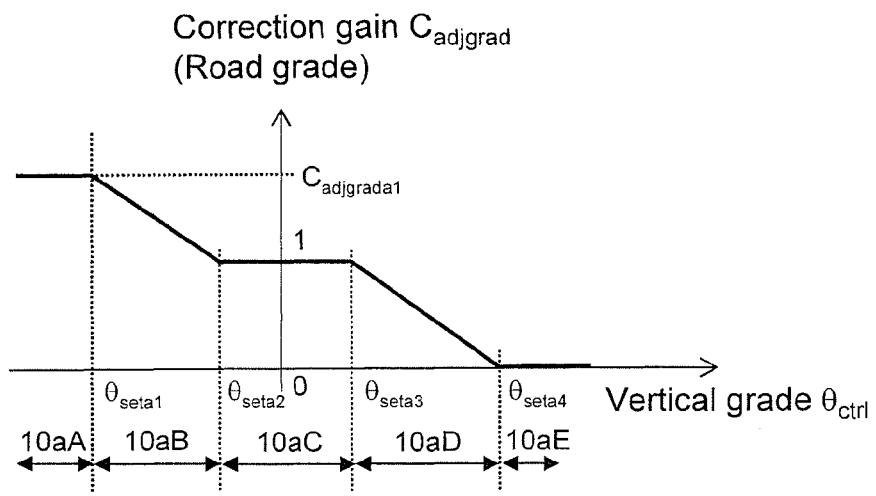
FIG. 10A is a view showing the relation between a vertical grade and a correction gain $C_{adjgrad}$ in the vehicle motion control system according to the present invention.

In the case where the longitudinal acceleration command value is negative as shown in FIG. 10A, appropriately setting the values of $\theta_{seta1}$, $\theta_{seta2}$, $\theta_{seta3}$, $\theta_{seta4}$, $\theta_{setb1}$, $\theta_{setb2}$, $\theta_{setb3}$ and $\theta_{setb4}$, as well as $C_{adjgrada1}$ and $C_{adjgradb1}$ makes it possible to create an area 10aA where the correction gain $C_{adjgrad}$ is equal to $C_{adjgrada1}$ if the vertical grade for control $\theta_{ctrl}$ is equal to or lower than a given negative value, areas 10aB and 10aD where the correction gain $C_{adjgrad}$ decreases in response to the increase in vertical grade for control $\theta_{ctrl}$, an area 10aC where the correction gain $C_{adjgrad}$ is set to 1 if an absolute value of the vertical grade for control $\theta_{ctrl}$ is small, and an area 10aE where the correction gain $C_{adjgrad}$ is set to 0 if the vertical grade for control $\theta_{ctrl}$ is equal to or more than a given positive value. Similarly, in the case where the longitudinal acceleration command value is positive as shown in FIG. 10B, it becomes possible to create an area 10bA where the correction gain $C_{adjgrad}$ is set to 0 if the vertical grade for control $\theta_{ctrl}$ is equal to or less than a given negative value, areas 10bB and 10bD where the correction gain $C_{adjgrad}$ increases in response to the increase in vertical grade for control $\theta_{ctrl}$, an area 10bC where the correction gain $C_{adjgrad}$ is set to 1 if an absolute value of the vertical grade for control $\theta_{ctrl}$ is small, and an area 10bE where the correction gain $C_{adjgrad}$ is equal to $C_{adjgradb1}$ if the vertical grade for control $\theta_{ctrl}$ is equal to or more than a given positive value.

Accordingly, in the area where the absolute value of the vertical grade is small, correction is not implemented, whereas in the case of executing control with a negative longitudinal acceleration command value, i.e., in the case of deceleration control, the deceleration in the descending grade can be increased and the deceleration in the ascending grade can be decreased. Moreover, when a descending curve is present ahead of the own vehicle while the own vehicle travels on a flat road, creating the vertical grade for control $\theta_{ctrl}$ based on the vertical grade at the front watch point makes it possible to implement deceleration control in consideration of the descending grade present ahead even when the own vehicle is positioned on the flat road.

Figure 10B:
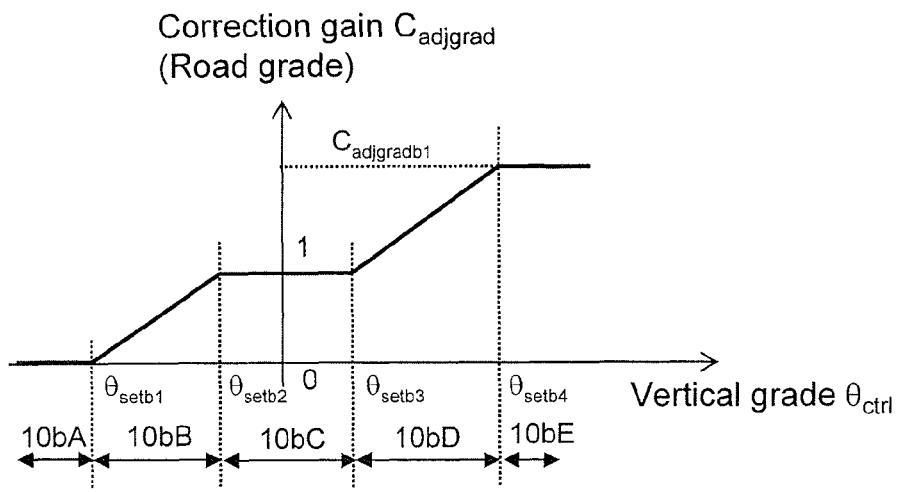
FIG. 10B is a view showing the relation between a vertical grade and a correction gain $C_{adjgrad}$ in the vehicle motion control system according to the present invention.

The method for setting the correction gain $C_{adjgrad}$ with respect to the vertical grade is not limited to the method shown in FIG. 10. Any method can be adopted in which the correction gain $C_{adjgrad}$ is set to 1 when the absolute value of the vertical grade is small with respect to the vertical grade, and the correction gain $C_{adjgrad}$ is more than 1 at the time of the descending grade and is less than 1 at the time of the ascending grade in the deceleration control (see FIG. 10A), whereas the correction gain $C_{adjgrad}$ is less than 1 at the time of the descending grade and more than 1 at the time of the ascending grade in the acceleration control (see FIG. 10B).

Figure 11:
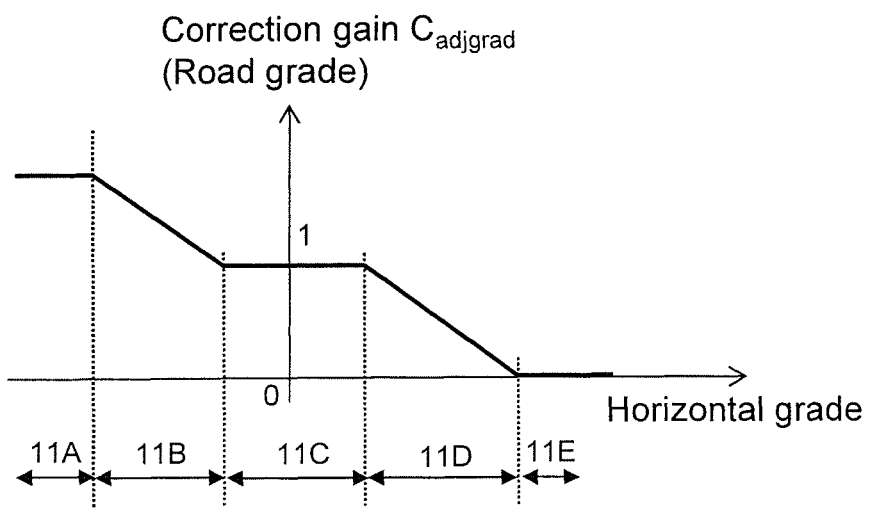
FIG. 11 is a view showing the relation between a horizontal grade and a correction gain $C_{adjgrad}$ in the vehicle motion control system according to the present invention.

Although the correcting method using the vertical grade as the road grade is shown in the foregoing description, the correction gain $C_{adjgrad}$ may be changed according to a horizontal grade if the horizontal grade referred to as cant is available. For example, when a ascending grade from a turning inside to a turning outside of the curve is defined as positive, as shown in FIG. 11, the correction gain $C_{adjgrad}$ is set to 1 in an area 11C where an absolute value of a horizontal grade is equal to or less than a given value, the correction gain $C_{adjgrad}$ is set to more than 1 in areas 11A and 11B where the horizontal grade is smaller than that in the area 11C, and the correction gain $C_{adjgrad}$ is set to less than 1 in areas 11D and 11E where the horizontal grade is larger than that in the area 11C. Accordingly, since the horizontal grade is large on a bank road having an ascending grade toward the turning outside, the correction gain $C_{adjgrad}$ becomes a small value. This makes it possible to suppress excessive deceleration. Since the horizontal grade is small on the road having a descending grade toward the turning outside, the correction gain $C_{adjgrad}$ becomes a large value, and this makes it possible to achieve sufficient deceleration.

Figure 12:
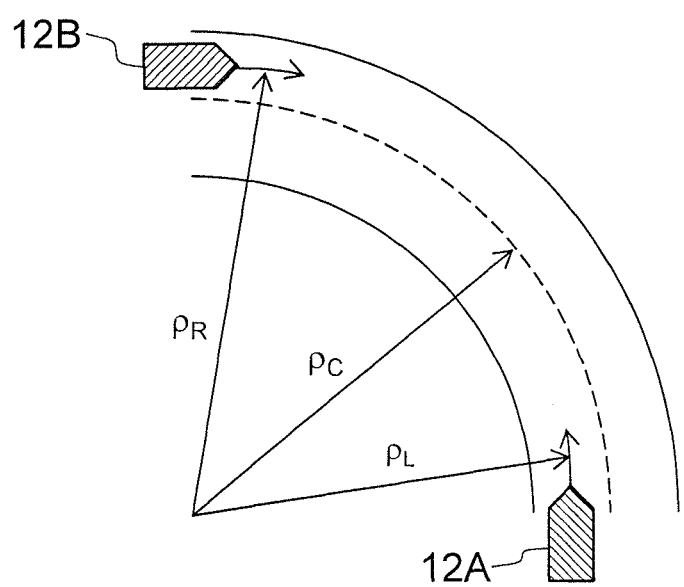
FIG. 12 is a view showing a difference in curve radius due to turning direction.

A correction gain calculation section (turning direction) 23 calculates a correction gain $C_{adjdir}$ based on turning direction. As shown in FIG. 12, even when vehicles travel the same curve, the turning radius is different for a vehicle 12A which turns left and for a vehicle 12B which turns right. For example, in the case where vehicles travel on a left lane as in the case of Japan, a turning radius $\rho_L$ in left turn is generally smaller than a turning radius $\rho_R$ at the time of right turn. If the curve curvature of every lane that the own vehicle travels can be obtained with sufficient precision, the correction gain relating to the turning direction is not necessary. However, when the curve curvature is represented by a value $\rho_C$ at the center position on the road for example, insufficient deceleration may occur in the left turn as compared with the right turn.

Figure 13:
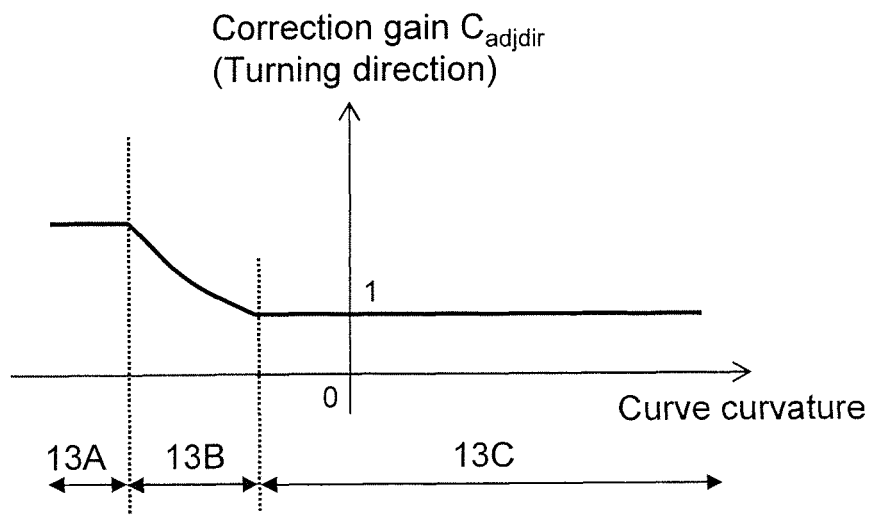
FIG. 13 is a view showing an example of the relation between a curve curvature and a correction gain $C_{adjdir}$ in the vehicle motion control system according to the present invention.

Accordingly, when the curve curvature at the time of right turn is defined as positive and the curve curvature at the time of left turn is defined as negative, the correction gain $C_{adjdir}$ with respect to the curve curvature is given in the form shown in FIG. 13. As shown in FIG. 13, the correction gain $C_{adjdir}$ is provided so that in areas 13A and 13B, the correction gain $C_{adjdir}$ is more than 1 when the curve curvature is negative, i.e., when the vehicle turns left, whereas in an area 13C where the curve curvature is negative though an absolute value thereof is small and where the curve curvature is positive, the correction gain $C_{adjdir}$ is set to 1.

Accordingly, in the area where the absolute value of the curve curvature is small, i.e., the area where the curve radius is large, the influence of difference in lane on the curve radius is small, and therefore the correction gain $C_{adjdir}$ is set to 1 and correction is not implemented. In the area where the influence of difference in lane is large and so the absolute value of the curve curvature is large, the correction gain $C_{adjdir}$ is set to be more than 1. As a result, the longitudinal acceleration control in the left turn can be corrected with respect to the right turn.

Figure 14:
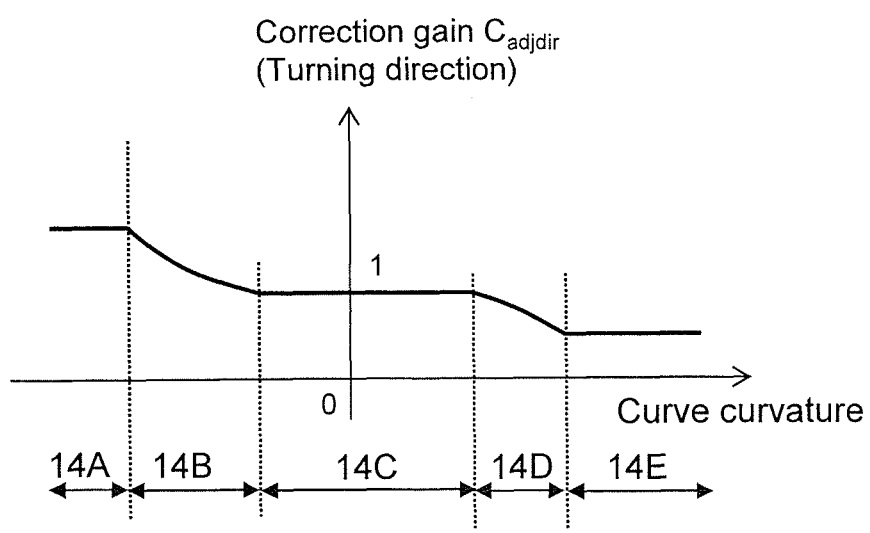
FIG. 14 is a view showing another example of the relation between a curve curvature and a correction gain $C_{adjdir}$ in the vehicle motion control system according to the present invention.

In FIG. 13, the method for correcting the longitudinal acceleration command value at the time of left turn based on the right turn is shown. Also in right turn, however, the correction gain $C_{adjdir}$ may be provided to be less than 1 in areas 14D and 14E where the absolute value of the curve curvature is large as shown in FIG. 14.

A correction gain calculation section (amount of pedal operation) 24 calculates a correction gain $C_{adjdrv}$ based on an amount of accelerator pedal operation or an amount of brake pedal operation by the driver. The correction gain $C_{adjdrv}$ is given in the form shown in FIG. 15 with use of a driver-requested acceleration or a driver-requested deceleration created from the amount of accelerator operation by the driver.

The driver-requested acceleration is a value which is 0 when the accelerator operation amount is the amount at the time of traveling at a constant speed and which increases in response to the increase in the amount of accelerator pedal operation. The driver-requested deceleration is a value which is 0 when the amount of brake pedal operation is 0 and which increases in response to the increase in the amount of brake pedal operation. In FIG. 15, $G_{xdrvseta1}$, $G_{xdrvseta2}$ and $G_{xdrvsetb}$ are values set so that $G_{xdrvseta1} < G_{xdrvseta2}$ and $0 \leq G_{xdrvsetb}$. These values may be preset values, values set according to input by the driver himself/herself, or values set according to the maximum lateral acceleration that can be generated for the vehicle when the system has a means to acquire the maximum lateral acceleration that can be generated for the vehicle.

Figure 15A:
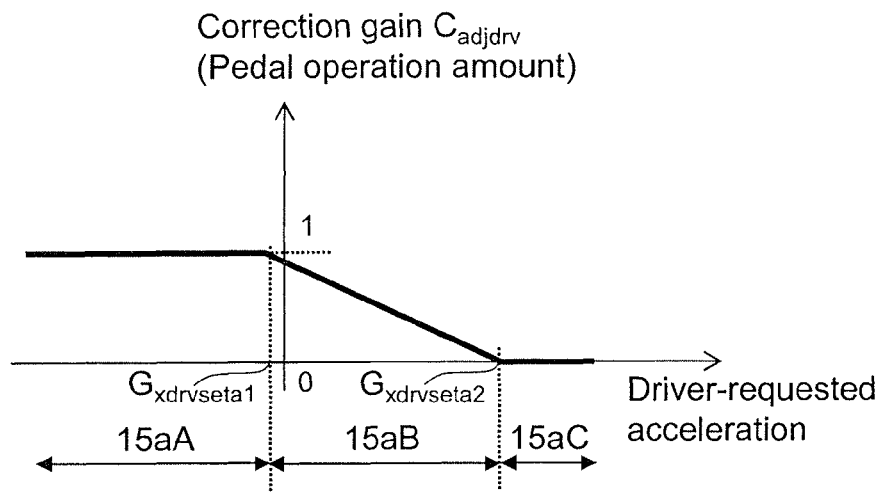
FIG. 15A is a view showing the relation between a driver-requested acceleration/deceleration and a correction gain $C_{adjdrv}$ in the vehicle motion control system according to the present invention.
Figure 15B:
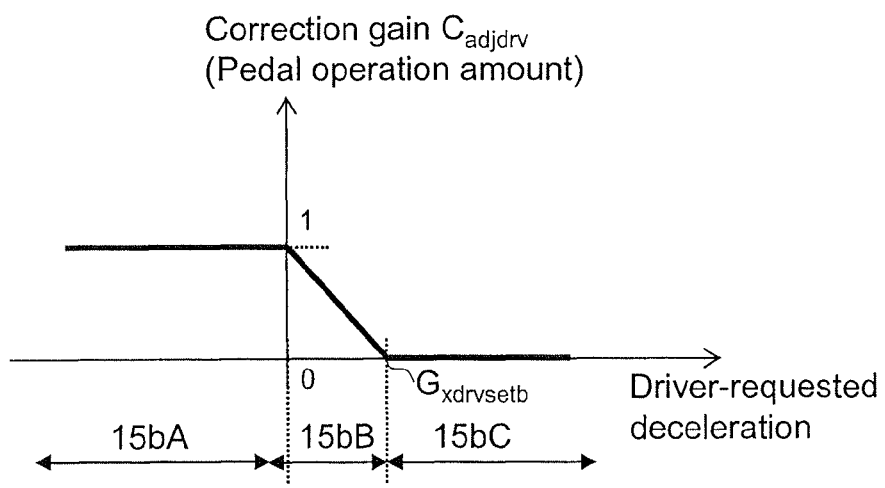
FIG. 15B is a view showing the relation between a driver-requested acceleration/deceleration and a correction gain $C_{adjdrv}$ in the vehicle motion control system according to the present invention.

By appropriately setting the values of $G_{xdrvseta1}$, $G_{xdrvseta2}$ and $G_{xdrvsetb}$, the correction gain $C_{adjdrv}$ is set to 1 in an area 15aA where the driver-requested acceleration is equal to or less than $G_{xdrvseta1}$ in the case where the longitudinal acceleration command value is negative as shown in FIG. 15A, the correction gain $C_{adjdrv}$ is decreased in response to the increase in the driver-requested acceleration in an area 15aB where the driver-requested acceleration is larger than $G_{xdrvseta1}$, and further the correction gain $C_{adjdrv}$ is set to 0 when the driver-requested acceleration is equal to or more than $G_{xdrvseta2}$. In the case where the longitudinal acceleration command value is positive as shown in FIG. 15B, the correction gain $C_{adjdrv}$ is set to 1 in an area 15bA where the driver-requested deceleration is equal to or less than 0, the correction gain $C_{adjdrv}$ is decreased in response to the increase in the driver-requested deceleration in an area 15bB where the driver-requested deceleration is more than 0, and the correction gain $C_{adjdrv}$ is set to 0 when the driver-requested deceleration is equal to or more than $G_{xdrvsetb}$.

In the case where the system has a means to acquire the maximum lateral acceleration that can be generated for the vehicle, the values of $G_{xdrvseta1}$ and $G_{xdrvseta2}$ may be changed based on a maximum lateral acceleration estimate $G_{ymaxEST}$ obtained by the aforementioned Formula (8) and a maximum possible lateral acceleration. For example, when the maximum lateral acceleration estimate $G_{ymaxEST}$ is equal to or more than the maximum possible lateral acceleration, the values of $G_{xdrvseta1}$ and $G_{xdrvseta2}$ are set to be equal to or more than a maximum driver-requested acceleration value, so that the correction gain $C_{adjdrv}$ can constantly be 1 regardless of the amount of accelerator pedal operation. Accordingly, when the maximum lateral acceleration estimate $G_{ymaxEST}$ is beyond the maximum possible lateral acceleration, deceleration control can be implemented regardless of the accelerator pedal operation by the driver.

As mentioned before, the proportional gains $C_{xy}$ and $C_x$ can be obtained by integrating each of the correction gains $C_{adjGy}$, $C_{adjgrad}$, $C_{adjdir}$ and $C_{adjdrv}$, which are obtained in the foregoing methods, to the proportional gain initial values $C_{xy0}$ and $C_{x0}$ in the proportional gain calculation section 25.

The foregoing description has disclosed the methods for creating correction gains from the maximum lateral acceleration estimate, the road grade, the turning direction and the amount of pedal operation and calculating proportional gains $C_{xy}$ and $C_x$. However, it is not necessarily needed to create all these correction gains. Correction may be implemented by adding the gains to the longitudinal acceleration command value. For example, correction with respect to the grade may be performed by calculating only a correction gain $C_{adjGy}$ and a correction gain $C_{adjdir}$ as the correction gains for calculation of the proportional gains $C_{xy}$ and $C_x$, and adding to the acquired longitudinal acceleration command value a longitudinal acceleration $G_{xgrad}$ generated due to the road grade when the longitudinal acceleration command value is other than 0. Similarly, when the longitudinal acceleration command value is negative, a longitudinal acceleration $G_{xacc}$ based on the accelerator pedal operation by the driver is added to the longitudinal acceleration command value, whereas when the longitudinal acceleration command value is positive, a longitudinal acceleration $G_{xbrk}$ based on the brake pedal operation by the drive is added thereto, by which correction with respect to pedal operation by the driver may be implemented.

First Embodiment

Hereinafter, a configuration and operation of a vehicle motion control system according to a first embodiment of the present invention will be explained with reference to FIGS. 16 to 21.

First, a description will be given of the configuration of the vehicle motion control system according to the first embodiment of the present invention with reference to FIG. 16.

Figure 16:
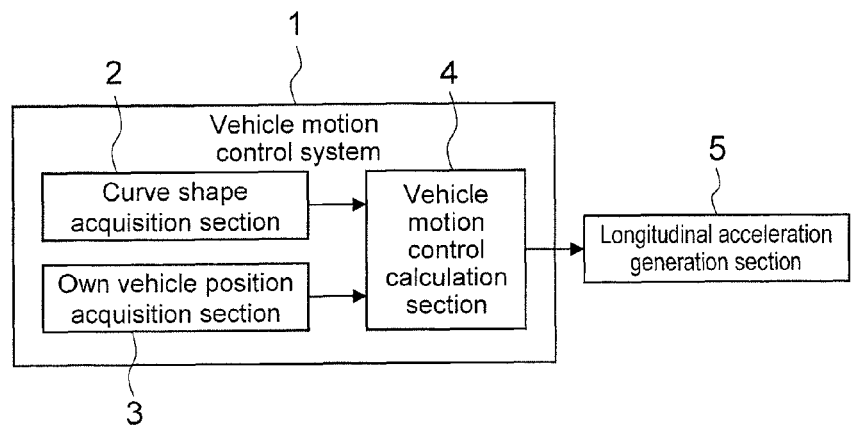
FIG. 16 is a view showing a first embodiment of the vehicle motion control system according to the present invention.

FIG. 16 is a system block diagram showing the configuration of the vehicle motion control system according to the first embodiment of the present invention.

A vehicle motion control system 1 of the present embodiment, which is mounted in a vehicle, includes a curve shape acquisition section 2 for acquiring the curve shape ahead of an own vehicle, an own vehicle position acquisition section 3 for acquiring a position of the own vehicle, and a vehicle motion control calculation section 4 for calculating a longitudinal acceleration to be generated for the vehicle based on the information acquired by the curve shape acquisition section 2 and the own vehicle position acquisition section 3. A calculation result by the vehicle motion control calculation section 4 is sent to a longitudinal acceleration generation section 5, by which an actuator which can generate a longitudinal acceleration for the vehicle is driven.

The curve shape acquisition section 2 may be a method for obtaining a curve shape from the map information on a course that the own vehicle travels, a method for obtaining curve information in a travelling direction of the own vehicle through communication between road and vehicle, a method for obtaining curve information from a vehicle traveling in front of the travelling direction of the own vehicle through communication between vehicles, or a method for obtaining the curve shape ahead of the own vehicle by an imaging means. The curve shape acquisition section 2 may also be a method for obtaining curve shape information through communication with a map information acquisition means, a road-to-vehicle communication means, a car-to-car communication means, or an imaging means.

The own vehicle position acquisition section 3 may be a method for obtaining an own vehicle position with respect to the curve ahead of the own vehicle from the coordinates of the own vehicle through a global positioning system (GPS), a method for obtaining the own vehicle position with respect to the curve ahead of the own vehicle through communication between road and vehicle, or a method for obtaining an image of the front area of the own vehicle or an image of the periphery of the own vehicle or obtaining both of the images by the imaging means for obtaining the own vehicle position with respect to the curve ahead of the own vehicle. The own vehicle position acquisition section 3 may also be a method for obtaining the own vehicle position with respect to the curve through communication with GPS, the road-to-vehicle communication means, or the imaging means.

A plurality of methods may be provided as the curve shape acquisition section 2 and the own vehicle position acquisition section 3. For example, a means for obtaining map information and curve shape information by the imaging means may be provided as the curve shape acquisition section 2, and a means for obtaining the own vehicle position by GPS and by the imaging means may be provided as the own vehicle position acquisition section 3. A plurality of methods are combined, so that as information on the place at a distance from a curve, map information, and curve shape information and own vehicle position information by GPS are used, while in the vicinity of the curve, curve shape information and own vehicle position information by the imaging means are used in addition to the map information as well as the curve shape information and own vehicle position information by GPS. This makes it possible to obtain more accurate curve shape information and own vehicle position information.

When acquisition of the own vehicle position information by GPS is difficult, curve shape information and own vehicle position information required for longitudinal acceleration control can be obtained by acquiring curve shape information and own vehicle position information by the imaging means. On the contrary, in the situation where curve shape information and own vehicle position information are difficult to obtain through the imaging means, the curve shape information and the own vehicle position information are obtained through GPS and map information, so that the curve shape information and the own vehicle position information required for longitudinal acceleration control can be obtained.

The longitudinal acceleration generation section 5 can be embodied by an acceleration/deceleration actuator which can generate a longitudinal acceleration, such as an engine for generating a longitudinal acceleration by controlling an engine throttle opening, a motor for generating a longitudinal acceleration by controlling the driving torque of the motor, a change gear for generating a longitudinal acceleration by changing a change gear ratio at the time of transmitting power to each wheel, and a friction brake for generating a longitudinal acceleration by pushing a brake disc to a brake pad of each wheel.

The vehicle motion control calculation section 4 is an arithmetic unit having a storage area, arithmetic processing capacity, and a signal input/output means. The vehicle motion control calculation section 4 calculates a longitudinal acceleration command value to be generated for the vehicle from the curve shape and the own vehicle position acquired by the curve shape acquisition section 2 and the own vehicle position acquisition section 3. The acquired longitudinal acceleration command value is sent to a drive controller of the acceleration/deceleration actuator which serves as the longitudinal acceleration generation section 5 capable of generating a longitudinal acceleration used as the longitudinal acceleration command value.

A signal to be sent is not a longitudinal acceleration but should only be a signal which can implement the longitudinal acceleration command value with the acceleration/deceleration actuator.

For example, in the case where the acceleration/deceleration actuator is a hydraulic friction brake which pushes a brake pad to a brake disc with hydraulic pressure, a hydraulic pressure command value for implementing the longitudinal acceleration command value is sent to a hydraulic friction-brake controller. A driving signal of the hydraulic friction-brake driving actuator for implementing the longitudinal acceleration command value may directly be sent to the hydraulic friction-brake driving actuator without using the hydraulic friction-brake controller.

In implementing the longitudinal acceleration command value, the acceleration/deceleration actuator which performs drive control in response to the longitudinal acceleration command value may be changed.

For example, a command value for changing the change gear ratio of the change gear may be sent to a change-gear controller to implement the longitudinal acceleration command value in deceleration operation when the own vehicle is positioned at a distance from a curve, and a hydraulic pressure command value may be sent to the hydraulic friction-brake controller to implement the longitudinal acceleration command value in deceleration operation in the vicinity of the curve.

Hereinafter, a description will be given of a method for creating a longitudinal acceleration command value in the case where the map information on the course that the own vehicle travels is used as the curve shape acquisition section 2 and GPS is used as the own vehicle position acquisition section 3.

Figure 17:
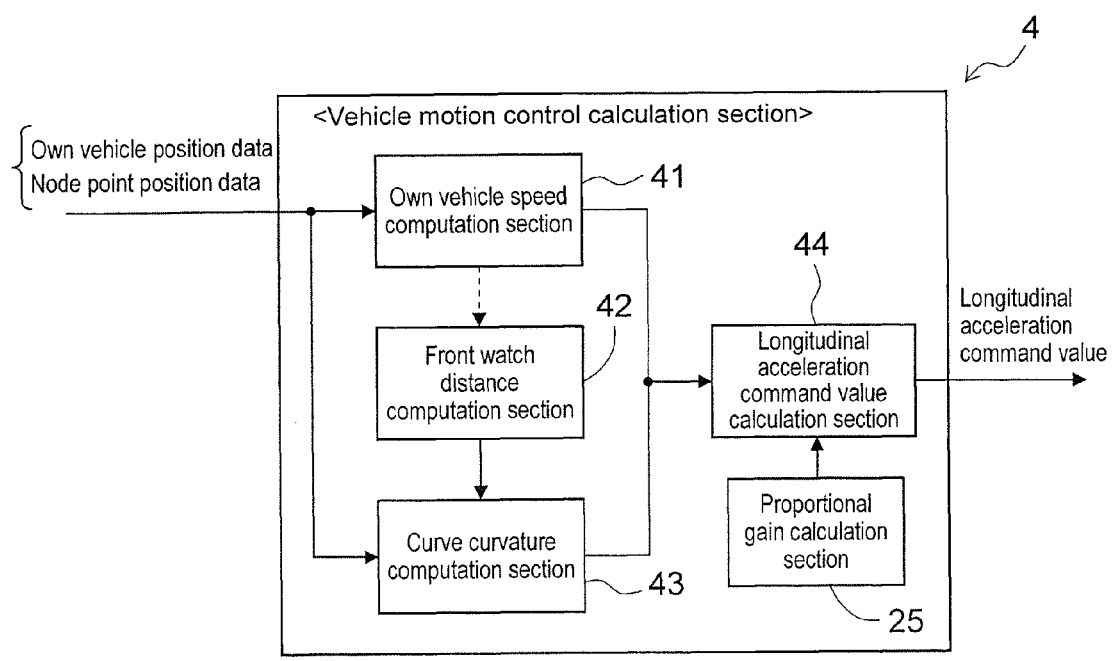
FIG. 17 is a view showing an example of a vehicle motion control calculation section of the vehicle motion control system shown in FIG. 16.

As shown in FIG. 17, the vehicle motion control calculation section 4 includes an own vehicle speed computation section 41 for computing the speed of an own vehicle, a front watch distance computation section 42 for computing a front watch distance from the position of the own vehicle to a front watch point, a curve curvature computation section 43 for computing a curve curvature and a temporal change of the curve curvature in the front watch distance, and a longitudinal acceleration command value calculation section 44 for calculating the longitudinal acceleration command value based on the curve curvature and the temporal change of the curve curvature in the front watch distance, and on a vehicle speed. The vehicle motion control calculation section 4 also includes a proportional gain calculation section 25 for calculating a proportional gain for changing the longitudinal acceleration command value based on at least one of the maximum lateral acceleration estimate, the grade of the road ahead of the own vehicle, the pedal operation by the driver, and the turning direction.

Figure 18:
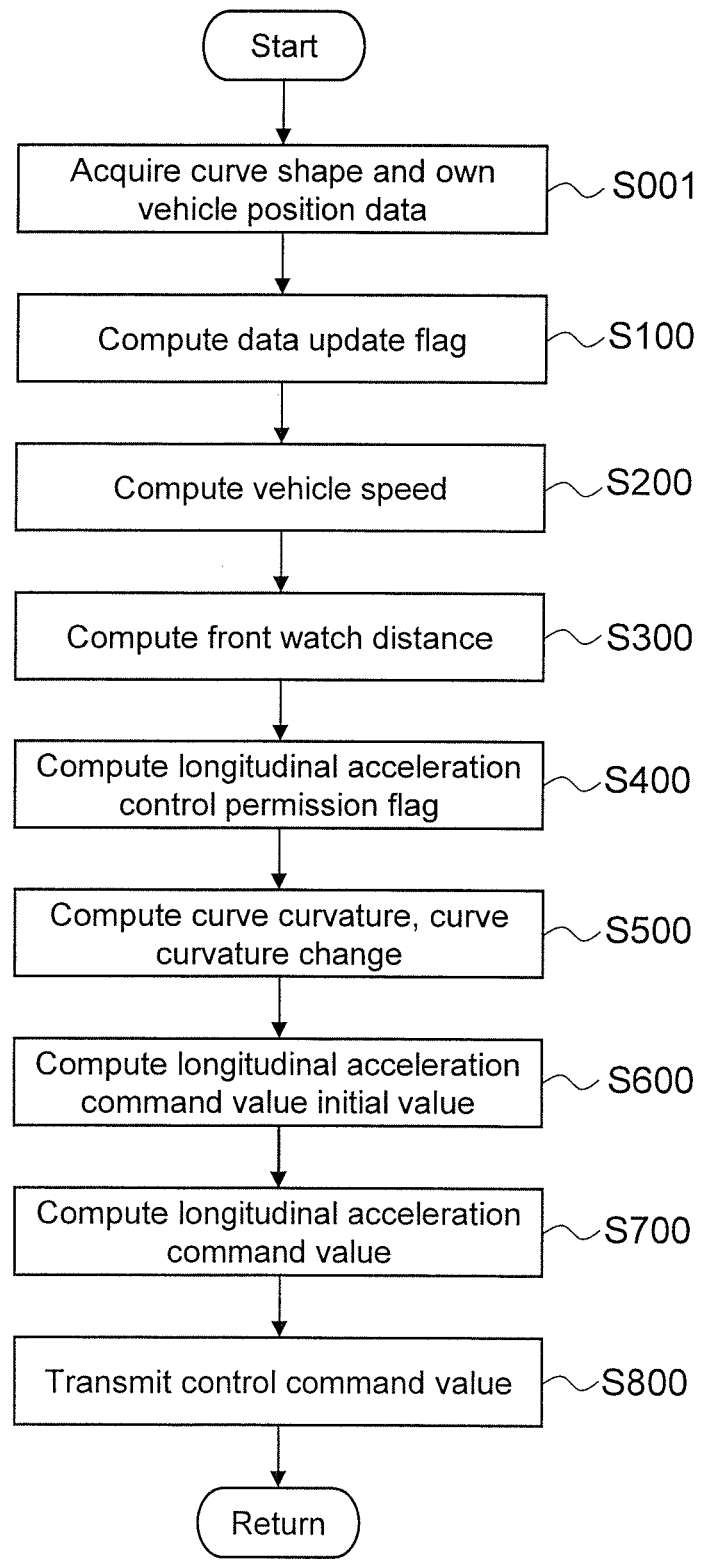
FIG. 18 is a view showing a flowchart of the vehicle motion control system of FIG. 16.

FIG. 18 shows a calculation flowchart in the vehicle motion control system 1 of the first embodiment.

Figure 19:
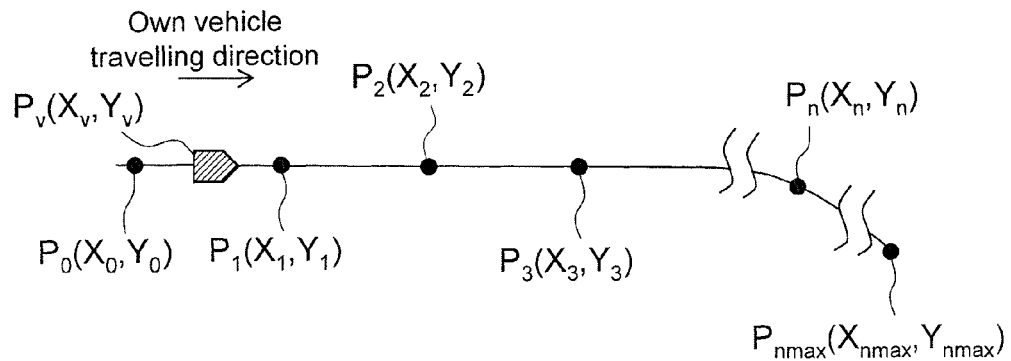
FIG. 19 is a concept view showing an own vehicle position and node point positions in the vehicle motion control system of FIG. 16.

In step S001, own vehicle position data $P_v(X_v, Y_v)$ by GPS and node point position data $P_n(X_n, Y_n)$ on a node point present in the travelling direction of the own vehicle are obtained as curve shape data from own vehicle position information and map information and calculation is executed therewith. As shown in FIG. 19, n represents an integer which takes a value of 0 at the first node point position located on the opposite side of the travelling direction of the own vehicle and which increases like 1, 2 . . . , nmax in the travelling direction of the own vehicle, where nmax is a maximum value of an obtainable node point position data number n. After calculation, the procedure proceeds to step S100.

In step S100, it is determined whether or not the own vehicle position data $P_v(X_v, Y_v)$ by GPS is updated. If the data is updated, a data update flag $F_{GPSref}$ is set to 1. If not, the data update flag $F_{GPSref}$ is set to 0. After calculation, the procedure proceeds to step S200. The update may be determined by comparing the own vehicle position data $P_v$ ($X_v$, $Y_v$) with previous value $P_{v\_z1}$ ($X_{v\_z1}$, $Y_{v\_z1}$), or the update may be determined by obtaining an update flag in addition to the own vehicle position data from GPS.

In step S200, the own vehicle speed computation section 41 shown in FIG. 17 computes a vehicle speed from a temporal change of the own vehicle position. When the data update flag is 0, the previous result of vehicle speed calculation is used as the vehicle speed. When the data update flag is 1, the vehicle speed V which is a movement speed of the own vehicle is computed from a time $\Delta t_P$ taken for the present data update flag to be 1 after the previous data update flag was set to 1, and a travel distance $\Delta L_v$ of the own vehicle, which is computed from previous own vehicle position data $P_{v\_p z1}$ ($X_{v\_p z1}$, $Y_{v\_p z1}$) when the previous data update flag was 1 and the present own vehicle position data $P_v$ ($X_v$, $Y_v$).

Figure 20:
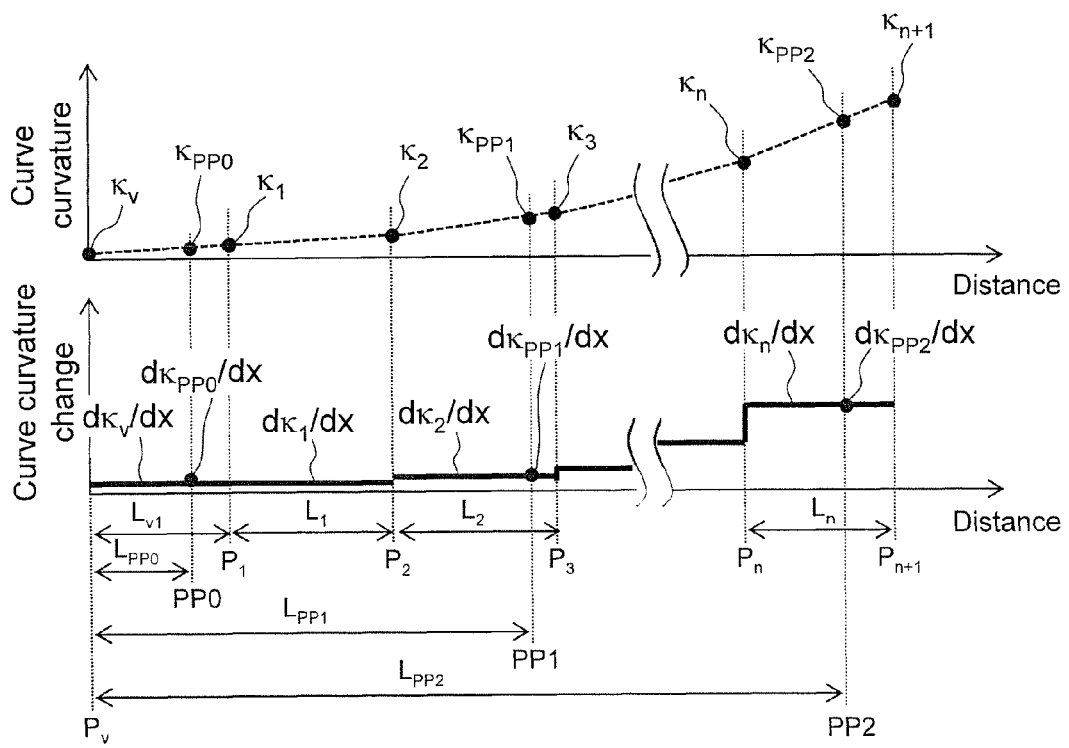
FIG. 20 is a view showing the relation between a distance and a curve curvature and a curve curvature change in the vehicle motion control system of FIG. 16.

In step S300, a front watch distance is calculated by the front watch distance computation section 42 shown in FIG. 17. As shown in FIG. 20, three front watch points PP0, PP1 and PP2 are set on the course in the travelling direction of the own vehicle at positions ranging from a position extremely near the own vehicle to a position distanced from the own vehicle. Front watch distances $L_{PP0}$, $L_{PP1}$ and $L_{PP2}$ from the own vehicle to the front watch points PP0, PP1 and PP2 are computed.

The front watch distances $L_{PP0}$, $L_{PP1}$ and $L_{PP2}$ may be values preset to satisfy the relation of the following Formula (10), or may be provided as shown in Formula (11) with use of preset front watch time $T_{PP0}$, $T_{PP1}$ and $T_{PP2}$ (provided that $T_{PP0} < T_{PP1} < T_{PP2}$) and the vehicle speed V. It is to be noted that the front watch point PP0 is a watch point extremely near the own vehicle and that $L_{max}$ is a value obtained by adding a distance from the own vehicle position to the node point position $P_1$ and a distance between respective node points from the node point position $P_1$ to the node point position $P_{nmax}$. After calculation, the procedure proceeds to step S400.

$$L_{PP0} < L_{PP1} < L_{PP2} \leq L_{max} \tag{10}$$

$$L_{PPm} = T_{PPm} \cdot V (m=0,1,2) \tag{11}$$

In step S400, a longitudinal acceleration control permission flag is calculated. The longitudinal acceleration control permission flag permits longitudinal acceleration control when its value is 1, and prohibits longitudinal acceleration control when its value is 0. The longitudinal acceleration control permission flag may be created in the following method. For example, if a period of time when the data update flag $F_{GPSref}$ is 0 is equal to or more than a predetermined time, it is determined that acquisition of the own vehicle position data by GPS is difficult and so the longitudinal acceleration control permission flag is set to 0.

Moreover, in the case where deviation between a travel locus based on the own vehicle position data and a course shape that the own vehicle assumedly is traveling on the map data is large, it is determined that the travel course of the own vehicle on the map data is different from an actual course and so the longitudinal acceleration control permission flag is set to 0.

The longitudinal acceleration control permission flag may also be set to 0 according to the vehicle speed V. For example, a minimum vehicle speed for start of control is set in advance. If the vehicle speed V is smaller than the minimum vehicle speed, then the longitudinal acceleration control permission flag is set to 0.

Also in the case where the system has a plurality of means for acquiring the curve shape data and for acquiring the own vehicle position data as described before, the longitudinal acceleration control permission flag is set to 0 if it is determined that the curve shape data and the own vehicle position data are difficult to acquire through all the acquisition means. For example, in the case where the curve shape data and the own vehicle position data are acquired by the imaging means as well as by GPS, the longitudinal acceleration control permission flag is set to 0 if it is determined that the own vehicle position data is difficult to acquire by GPS as mentioned above and then it is also determined that the curve shape data and the own vehicle position data are difficult to acquire by the imaging means. Under the conditions other than the above, the longitudinal acceleration control permission flag is set to 1. After calculation, the procedure proceeds to step S500.

In step S500, a curve curvature $\kappa_n$ at the positions of respective node points in which n in node point position data $P_n$($X_n$, $Y_n$) is 1 or more, a curve curvature $\kappa_v$ at the own vehicle position, and a curve curvature change between node points $d\kappa_n/dx$ are computed by the curve curvature computation section 43 shown in FIG. 17. Curve curvatures $\kappa_{PP0}$, $\kappa_{PP1}$ and $\kappa_{PP2}$ and curve curvature changes $d\kappa_{PP0}/dx$, $d\kappa_{PP1}/dx$ and $d\kappa_{PP2}/dx$ in the front watch distances $L_{PP0}$, $L_{PP1}$ and $L_{PP2}$ are computed. To calculate the curve curvature, the curve curvature radius of a circular arc extending along successive three node points $P_{n-1}$, $P_n$ and $P_{n+1}$ may be obtained and then the reciprocal of the obtained curve curvature radius may be used to obtain a curve curvature $\kappa_n$ at the node point $P_n$.

If the own vehicle position is identical to the node point position $P_1$, the curve curvature $\kappa_v$ at the own vehicle position is equal to curve curvature $\kappa_1$, whereas if the own vehicle position is not identical, then the curve curvature $\kappa_v$ can be computed from the node point $P_0$, $P_v$ and $P_1$. It is to be noted that the curve curvature $\kappa_n$ and the curve curvature $\kappa_v$ are positive despite of the direction of the curve.

When the curve curvature radius is large enough, the curve curvature $\kappa_n$ may be set to 0. The curve curvature change $d\kappa_n/dx$ is computed from the thus-obtained curve curvature $\kappa_n$ at each node point and from the distance between respective node points. As shown in FIG. 20, when a gap between each node is linearly complemented and a distance between the node points $P_n$ and $P_{n+1}$ is defined as $L_n$, a curve curvature change $d\kappa_n/dx$ between the node points $P_n$ and $P_{n+1}$ is given by the following Formula (12).

$$\frac{d\kappa_n}{dx} = \frac{(\kappa_{n+1} - \kappa_n)}{L_n} \tag{12}$$

Similarly, when a distance between the own vehicle position $P_v$ and the node point $P_1$ is defined as $L_{v1}$, a curve curvature change $d\kappa_v/dx$ between the own vehicle position $P_v$ and the node point $P_1$ is given by the following Formula (13).

$$\begin{cases} \dfrac{d\kappa_V}{dx} = \dfrac{(\kappa_1 - \kappa_V)}{L_{V1}} & (L_{v1} > 0) \\ \dfrac{d\kappa_V}{dx} = \dfrac{d\kappa_1}{dx} & (L_{v1} = 0) \end{cases} \tag{13}$$

After the curve curvature $\kappa_n$ and the curve curvature change $d\kappa_n/dx$ at each node point are computed, curve curvatures $\kappa_{PP0}$, $\kappa_{PP1}$ and $\kappa_{PP2}$ and curve curvature changes $d\kappa_{PP0}/dx$, $d\kappa_{PP1}/dx$ and $d\kappa_{PP2}/dx$ corresponding to the front watch distances $L_{PP0}$, $L_{PP1}$ and $L_{PP2}$ are computed. For example, as shown in FIG. 20, when PP0 is present between $P_v$ and $P_1$, PP1 is present between $P_2$ and $P_3$, and PP2 is present between $P_n$ and $P_{n+1}$, the curve curvatures $\kappa_{PP0}$, $\kappa_{PP1}$ and $\kappa_{PP2}$ and the curve curvature changes $d\kappa_{PP0}/dx$, $d\kappa_{PP1}/dx$ and $d\kappa_{PP2}/dx$ are given by the following Formulas (14) to (19).

$$\kappa_{PP0} = \kappa_V + \frac{d\kappa_V}{dx} \cdot L_{PP0} \tag{14}$$

$$\kappa_{PP1} = \kappa_2 + \frac{d\kappa_2}{dx} \cdot \{L_{PP1} - (L_{v1} + L_1)\} \tag{15}$$

$$\kappa_{PP2} = \kappa_n + \frac{d\kappa_n}{dx} \cdot \left\{ L_{PP2} - \left( L_{v1} + \sum_{j=1}^{n} L_j \right) \right\} \tag{16}$$

$$\frac{d\kappa_{PP0}}{dx} = \frac{d\kappa_V}{dx} \tag{17}$$

$$\frac{d\kappa_{PP1}}{dx} = \frac{d\kappa_2}{dx} \tag{18}$$

$$\frac{d\kappa_{PP2}}{dx} = \frac{d\kappa_n}{dx} \tag{19}$$

The methods for calculating the curve curvature $\kappa_n$ and the curve curvature change $d\kappa_n/dx$ at each node point are not limited to the methods described above. Any method can be adopted which can compute the curve curvature and the curve curvature change at each node point. After calculation, the procedure proceeds to step S600.

In step S600, the longitudinal acceleration command value calculation section 44 shown in FIG. 17 creates a longitudinal acceleration command value initial value based on the curve curvatures $\kappa_{PP0}$, $\kappa_{PP1}$ and $\kappa_{PP2}$, the curve curvature changes $d\kappa_{PP0}/dx$, $d\kappa_{PP1}/dx$, $d\kappa_{PP2}/dx$ in the front watch distances $L_{PP0}$, $L_{PP1}$ and $L_{PP2}$, and the vehicle speed V. Longitudinal acceleration command values $G_{xREQiniPP0}$ and $G_{xREQiniPP1}$ based on the curve curvature changes $d\kappa_{PP0}/dx$ and $d\kappa_{PP1}/dx$ in the vicinity of the vehicle are computed by the aforementioned Formula (6). A longitudinal acceleration command value $G_{xREQiniPP2}$ based on the curve curvature $\kappa_{PP2}$ at a distance from the vehicle is created by the aforementioned method shown in FIG. 3.

In the case where the front watch distances $L_{PP0}$, $L_{PP1}$ and $L_{PP2}$ are created with the front watch time $T_{PP0}$, $T_{PP1}$ and $T_{PP2}$ shown in the aforementioned Formula (11), movement speeds $V_{PP0}$, $V_{PP1}$ and $V_{PP2}$ of the front watch points PP0, PP1 and PP2 are given by the following Formula (20) with use of a vehicle longitudinal acceleration $G_x$ obtained by differentiating the vehicle speed V.

When the system is structured to have a means to obtain a longitudinal acceleration through communication with other controllers or through direct measurement with an acceleration sensor, the longitudinal acceleration $G_x$ may be created from the longitudinal acceleration obtained by the means.

$$V_{PPm} = V + T_{PPm} \cdot G_x \quad (m=0,1,2) \tag{20}$$

Based on Formulas (6) and (20), the longitudinal acceleration command values $G_{xREQiniPP0}$ and $G_{xREQiniPP1}$ are calculated by the following Formula (21). The longitudinal acceleration command value $G_{xREQiniPP2}$ is also calculated with reference to FIG. 3.

$$G_{xREQiniPPm} = -C_{xym} \cdot \frac{d\kappa_{PPm}}{dx} \cdot V_{PPm} \cdot V^2 \quad (m=0,1) \tag{21}$$

In this formula, $C_{xy0}$ and $C_{xy1}$ are values obtained by integrating usable correction gains (e.g., correction gain $C_{adjGy}$ based on the maximum lateral acceleration estimate) among those shown in FIG. 6 to preset constants $C_{xy00}$ and $C_{xy10}$ when other information such as a road surface friction coefficient and accelerator operation by the driver are available. The constants $C_{xy00}$ and $C_{xy10}$ may be values variable in accordance with other conditions. For example, the constants when $d\kappa_{PPm}/dx$ is positive may be different from the constants when $d\kappa_{PPm}/dx$ is negative. The configuration of using information other than the curve shape or the own vehicle position will be described in a second embodiment. After calculation, the procedure proceeds to step S700.

In step S700, processing of longitudinal acceleration control with an intervention threshold, filtering, selection processing, summing processing and so forth are applied to longitudinal acceleration command value initial values $G_{xREQiniPP0}$, $G_{xREQiniPP1}$ and $G_{xREQiniPP2}$ to create a final longitudinal acceleration command value $G_{xREQfin}$. For example, filtering is applied to the longitudinal acceleration command values $G_{xREQiniPP0}$, $G_{xREQiniPP1}$ and $G_{xREQiniPP2}$ with a time constant set according to each sign and increase/decrease direction, and the selection processing and the summing processing are performed corresponding to the values obtained thereby.

Further, a longitudinal acceleration control intervention threshold on the side of deceleration is defined as $G_{xBRKs}$, a longitudinal acceleration control intervention threshold on the side of acceleration is defined as $G_{xACCs}$. With these intervention thresholds, processing of the longitudinal acceleration control is performed. The longitudinal acceleration control intervention thresholds $G_{xBRKs}$ and $G_{xACCs}$ are preset values.

In the area where two out of the longitudinal acceleration command values $G_{xREQiniPP0}$, $G_{xREQiniPP1}$ and $G_{xREQiniPP2}$ take a value other than 0 at the same time and if both of the command values have the same sign, then the command value having a larger absolute value is asserted, whereas if these command values have different signs, then respective values are added to have the final longitudinal acceleration command value. In the area where three of the longitudinal acceleration command values $G_{xREQiniPP0}$, $G_{xREQiniPP1}$ and $G_{xREQiniPP2}$ take a value other than 0 at the same time, absolute values of two command values having the same sign are compared, and the larger one is added to the remaining different-sign value to have the final longitudinal acceleration command value. Consequently, it becomes possible to decrease the deceleration in the case where $G_{xREQiniPP0}$ is positive and $G_{xREQiniPP2}$ is negative, i.e., in the case where the curve curvature change at the position extremely near the own vehicle is negative and a curve is present ahead of the own vehicle which makes the curve curvature change positive. Therefore, a sensory acceleration at the time of traveling successive curves can be enhanced.

When adding is performed, weighting may be applied in accordance with the sign. For example, to give priority to deceleration, a multiplier which diminishes a positive value may be integrated, whereas to give priority to acceleration, a multiplier which diminishes a negative value may be integrated at the time of adding.

Figure 21:
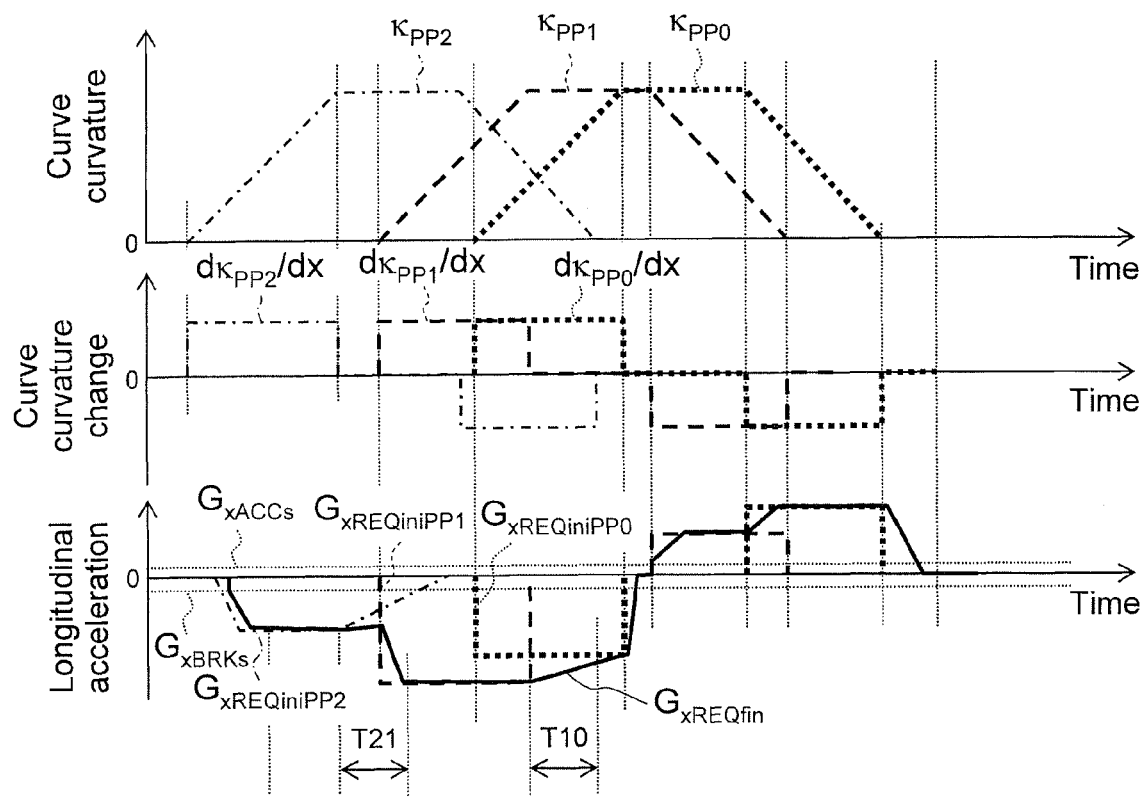
FIG. 21 shows a temporal change of a curve curvature, a curve curvature change and a longitudinal acceleration in the vehicle motion control system of FIG. 16.

Consequently, when the vehicle travels a curve structured to have the curve curvatures $\kappa_{PP0}$, $\kappa_{PP1}$ and $\kappa_{PP2}$ and the curve curvature changes $d\kappa_{PP0}/dx$, $d\kappa_{PP1}/dx$ and $d\kappa_{PP2}/dx$ as shown in FIG. 21, and when the longitudinal acceleration command values $G_{xREQiniPP0}$ shown with a dotted line, $G_{xREQiniPP1}$ shown with a broken line, and $G_{xREQiniPP2}$ shown with a dashed dotted line are obtained, then the longitudinal acceleration command value $G_{xREQfin}$ as shown with a solid line is obtained. The method for creating the longitudinal acceleration command value $G_{xREQfin}$ from $G_{xREQiniPP0}$, $G_{xREQiniPP1}$ and $G_{xREQiniPP2}$ is not limited to the foregoing description. It should be noted, however, that excessive negative longitudinal acceleration, i.e., excessive decrease in deceleration, should be prevented in a shift section from $G_{xREQiniPP2}$ to $G_{xREQiniPP1}$ shown with a reference sign T21 in FIG. 21.

Also in a shift section from $G_{xREQiniPP1}$ to $G_{xREQiniPP0}$ at the time of deceleration shown with a reference sign T10 in FIG. 21, excessive negative longitudinal acceleration, i.e., excessive decrease in deceleration, should be prevented. After calculation, the procedure proceeds to step S800.

In step S800, if the longitudinal acceleration control permission flag is 1, a command value for implementing the longitudinal acceleration command value $G_{xREQfin}$ is transmitted to the longitudinal acceleration generation section 5 shown in FIG. 16. If the longitudinal acceleration control permission flag is 0, a command value for disabling longitudinal acceleration control is transmitted thereto.

As for a signal transmitted when the longitudinal acceleration control permission flag is 1, the longitudinal acceleration command value $G_{xREQfin}$ is transmitted as a control command value in the case where the longitudinal acceleration command value $G_{xREQfin}$ is transmitted and the longitudinal acceleration generation section 5 can implement the received longitudinal acceleration command value $G_{xREQfin}$ as described before.

When the command value should be customized to the longitudinal acceleration generation section 5, a command value for controlling the longitudinal acceleration generation section 5 is created based on the longitudinal acceleration command value $G_{xREQfin}$ and is transmitted. For example, when the longitudinal acceleration generation section 5 is a hydraulic friction brake, and longitudinal acceleration control is performed by sending a hydraulic pressure command value to a hydraulic friction-brake controller, the hydraulic pressure command value is created based on the longitudinal acceleration command value $G_{xREQfin}$, and the created hydraulic pressure command value is transmitted as a control command value.

Accordingly, a longitudinal acceleration based on the longitudinal acceleration command value $G_{xREQfin}$ is generated for the vehicle.

As mentioned above, a command for implementing a longitudinal acceleration command value may be transmitted to a plurality of longitudinal acceleration generation section 5. For example, the longitudinal acceleration generation section 5 which implements the longitudinal acceleration created based on the longitudinal acceleration command value $G_{xREQiniPP2}$ at a distance from a curve may be embodied by the change gear or an engine, or embodied by both of the entities, while a hydraulic pressure friction brake may be further added as the longitudinal acceleration generation section 5 which implements the longitudinal acceleration created based on the longitudinal acceleration command values $G_{xREQiniPP1}$ and $G_{xREQiniPP0}$ in the vicinity of the curve.

This makes it possible to achieve relatively constant deceleration at a distance from a curve with an engine brake by changing a throttle opening of the engine or by changing a gear ratio of the change gear, while achieving deceleration of a large change in the vicinity of the curve with the hydraulic pressure friction brake. This makes it possible to implement the deceleration similar to the deceleration conducted by the driver. That is, when the driver visually recognizes a curve with a moderately large curve curvature in the travelling direction at a distance from the curve, the driver turns off an accelerator and conducts deceleration with an engine brake, and after clearly recognizing the curve curvature change in the vicinity of the curve, the driver operates the brake to decelerate the vehicle.

As described above, in the present embodiment, the deceleration generated for the vehicle is changed from deceleration at a distance from a curve to deceleration in the vicinity of the curve, so that excessive deceleration before the driver recognizes the details of a curve ahead is prevented and thereby driving feeling of the driver can be enhanced. Further, since proportional gains are corrected with use of the maximum lateral acceleration estimate and other information including the accelerator operation by the driver, the road grade, and the turning direction, driving feeling of the driver can be further enhanced.

Second Embodiment

Hereinafter, a configuration and operation of a vehicle motion control system according to a second embodiment of the present invention will be explained with reference to FIGS. 22 to 26. It is to be noted that component members identical to those in the first embodiment are designated by identical reference signs to omit detailed description.

First, a description will be given of the configuration of the vehicle motion control system according to the second embodiment of the present invention with reference to FIG. 22.

Figure 22:
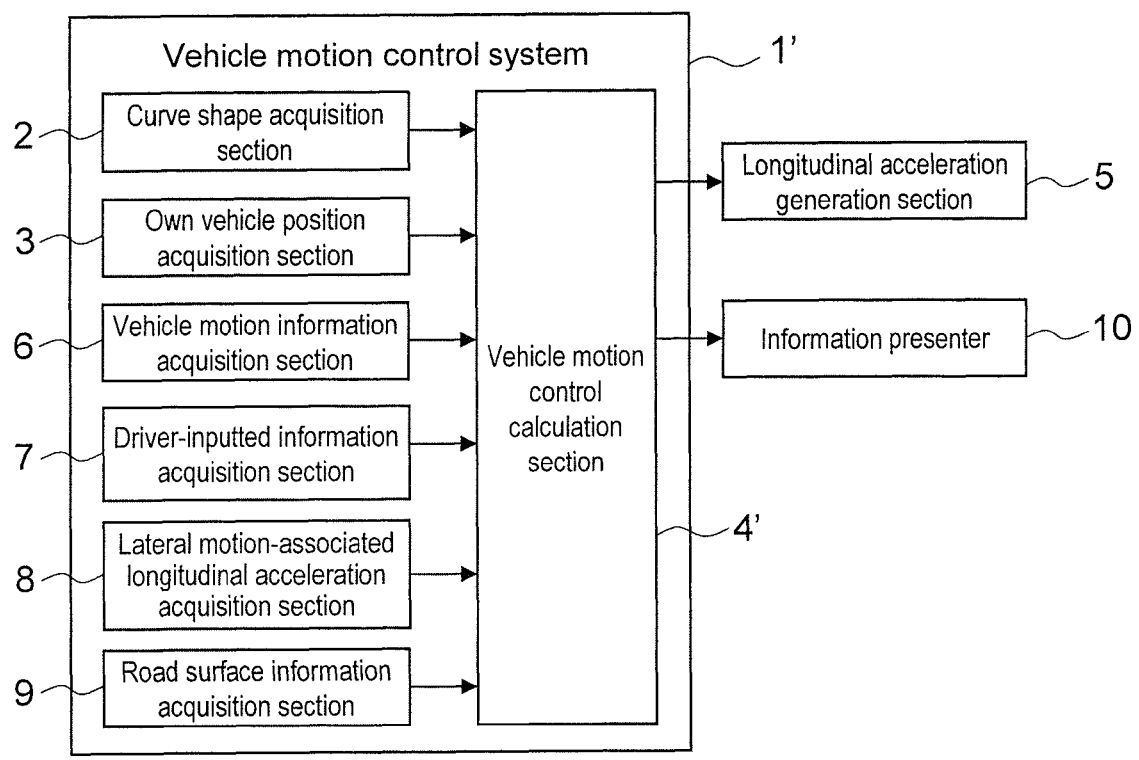
FIG. 22 is a view showing a second embodiment of the vehicle motion control system according to the present invention.

FIG. 22 is a system block diagram showing the configuration of the vehicle motion control system according to the second embodiment of the present invention.

A vehicle motion control system 1' of the second embodiment, which is mounted in a vehicle, includes a curve shape acquisition section 2 for acquiring the curve shape ahead of an own vehicle, an own vehicle position acquisition section 3 for acquiring a position of the own vehicle, a vehicle motion information acquisition section 6, a driver-inputted information acquisition section 7, a lateral motion-associated longitudinal acceleration acquisition section 8, and a road surface information acquisition section 9. The vehicle motion control system 1' also includes a vehicle motion control calculation section 4' for calculating a longitudinal acceleration to be generated for the vehicle based on the information acquired by the curve shape acquisition section 2, the own vehicle position acquisition section 3, the vehicle motion information acquisition section 6, the driver-inputted information acquisition section 7, the lateral motion-associated longitudinal acceleration acquisition section 8, and the road surface information acquisition section 9.

A calculation result of the vehicle motion control calculation section 4' is sent to the longitudinal acceleration generation section 5 and an information presenter 10, by which an actuator which can generate the longitudinal acceleration for the vehicle is driven and information is presented to the driver.

Since the curve shape acquisition section 2, the own vehicle position acquisition section 3 for acquiring an own vehicle position, and the longitudinal acceleration generation section 5 are similar to those in the aforementioned first embodiment, the detailed description thereof will be omitted.

In the vehicle motion information acquisition section 6, at least a vehicle speed V or a longitudinal acceleration $G_x$, or both of the parameters are acquired as vehicle motion information. As the vehicle speed V and the longitudinal acceleration $G_x$, values directly detected with a sensor and the like may be acquired, or results of calculation by other electronic controllers may be acquired through communication.

When the vehicle speed V and the longitudinal acceleration $G_x$ themselves cannot be inputted, it suffices that values which can be used to estimate values of these parameters be inputted. For example, a wheel speed Vw [wheel] of each wheel (FL (forward left wheel), FR (forward right wheel), RL (rear left wheel), and RR (rear right wheel) are each put into [wheel]) may be acquired instead of the vehicle speed V, and are used to estimate the vehicle speed V.

The driver-inputted information acquisition section 7 acquires at least a driver-requested longitudinal acceleration $G_{xDrvREQ}$ as input information from the driver. As the driver-requested longitudinal acceleration $G_{xDrvREQ}$, a value directly inputted by the driver may be acquired, or a result of calculation by other electronic controllers may be acquired through communication. When the driver-requested acceleration $G_{xDrvREQ}$ itself cannot be inputted, it suffices that a value which can be used to estimate the value of the parameter be inputted. For example, the driver-requested longitudinal acceleration $G_{xDrvREQ}$ may be estimated from the amount of accelerator pedal operation or the amount of brake pedal operation instead of the driver-requested longitudinal acceleration $G_{xDrvREQ}$. The driver-requested longitudinal acceleration $G_{xDrvREQ}$ excluding a deceleration by the brake operation may be estimated from only the amount of accelerator pedal operation.

When the vehicle has an engine as a source of drive, information on engine torque and a shift position may be acquired to estimate the driver-requested longitudinal acceleration $G_{xDrvREQ}$. In addition to the driver-requested longitudinal acceleration $G_{xDrvREQ}$, control ON/OFF information and values obtained when the driver adjusts or selects a controlled variable may be obtained.

The lateral motion-associated longitudinal acceleration acquisition section 8 acquires a longitudinal acceleration $G_{xGVC}$ based on a lateral jerk of the vehicle as shown, for example, in JP Patent Publication (Kokai) No. 2008-285066 and Transactions of Society of Automotive Engineers of Japan, Vol. 39, No. 3, 2008. In this case, when the longitudinal acceleration $G_{xGVC}$ itself cannot be inputted, it suffices that a value which can be used to estimate the value of the parameter be inputted. For example, a lateral jerk may be obtained instead of the longitudinal acceleration $G_{xGVC}$ to calculate the longitudinal acceleration $G_{xGVC}$. Moreover, lateral motion information such as a steering angle, a yaw rate and a lateral acceleration may be obtained to calculate the longitudinal acceleration $G_{xGVC}$.

The road surface information acquisition section 9 acquires at least a road surface friction coefficient μ and a road surface vertical grade Grad as road surface information. Here, when the road surface friction coefficient μ and the road surface vertical grade Grad themselves cannot be inputted, it suffices that values which can be used to estimate the values of these parameters be inputted. For example, a method may be used in which parameters such as the longitudinal acceleration $G_x$, each of the wheel speed Vw[wheel] and the vehicle speed V are acquired instead of the road surface friction coefficient μ, so that the road surface friction coefficient μ is estimated based on the acquired values. A method may be used in which self aligning torque generated by steering is acquired and used to estimate the road surface friction coefficient μ.

Moreover, a method may be used in which braking/driving force $F_{wx}$[wheel] of each wheel, or information substituting the braking/driving force (e.g., engine torque and brake pressure) is acquired and used to estimate the road surface friction coefficient μ. Moreover, instead of the road surface vertical grade Grad, the braking/driving force $F_{wx}$[wheel] of each wheel, or information substituting the braking/driving force (e.g., engine torque and brake pressure) and the longitudinal acceleration $G_x$ of the vehicle may be acquired, and the road surface vertical grade Grad may be estimated from the difference between the force generated in the wheels and the longitudinal acceleration actually generated. Moreover, a value (information) by the acceleration sensor, which is mounted so as to measure the acceleration in the longitudinal direction of the vehicle on a flat road, may be acquired, and the road surface vertical grade Grad may be estimated from the difference of the longitudinal acceleration produced by differentiating the vehicle speed V.

The vehicle motion control calculation section 4' is an arithmetic unit having a storage area, arithmetic processing capacity, and a signal input/output means. The vehicle motion control calculation section 4' calculates the longitudinal acceleration to be generated for the vehicle and information to be presented to the driver based on the information acquired by the curve shape acquisition section 2, the own vehicle position acquisition section 3, the vehicle motion information acquisition section 6, the driver-inputted information acquisition section 7, the lateral motion-associated longitudinal acceleration acquisition section 8, and the road surface information acquisition section 9, and sends a command value to the longitudinal acceleration generation section 5 and to the information presenter 10. The command value sent to the longitudinal acceleration generation section 5 should be customized to a target acceleration/deceleration actuator in the same way as in the aforementioned first embodiment.

The information presenter 10 is to be an information presenter which presents information that the driver can recognize through at least one of five senses, and the command value sent to the information presenter 10 is to be a command value that can drive the information presenter. For example, when the information presenter 10 is embodied by a presenter such as an indicator lamp or a display which visually provides information to the driver, a command value is sent for executing lighting of the indicator lamp and indication on the display based on the longitudinal acceleration to be generated for the vehicle.

When the information presenter 10 is embodied by a sound generator which acoustically gives information to the driver through beep sound, voice sound and the like, a command value is sent for giving guidance with beep sound or voice sound based on the longitudinal acceleration to be generated for the vehicle.

When the information presenter 10 is embodied by a vibration generator which haptically provides information to the driver through vibration of a handle, a pedal, a seat and the like, a command value is sent to the vibration generator which vibrates the handle, the pedal and the seat based on the longitudinal acceleration to be generated for the vehicle. The information presenter 10 may be produced by combining the indicator, the sound generator and the vibration generator.

Hereinafter, a description will be given of the method for creating the longitudinal acceleration command value in the case where the map information on the course that the own vehicle travels is used as the curve shape acquisition section 2, GPS is used as the own vehicle position acquisition section 3, and a means for communicating with other electronic controllers is used as the vehicle motion information acquisition section 6, the driver-inputted information acquisition section 7, the lateral motion-associated longitudinal acceleration acquisition section 8, and the road surface information acquisition section 9 to acquire the vehicle speed V, the longitudinal acceleration $G_x$, the driver-requested longitudinal acceleration $G_{xDrvREQ}$, the lateral motion-associated longitudinal acceleration $G_{xGVC}$, the road surface friction coefficient μ, and the road surface vertical grade Grad, and further in the case where a means for communicating with other electronic controllers or an input means such as a switch is used to acquire a longitudinal acceleration control switch ON/OFF information $F_{ctrlsw}$ and a driver set value $G_{DrvSet}$.

Figure 23:
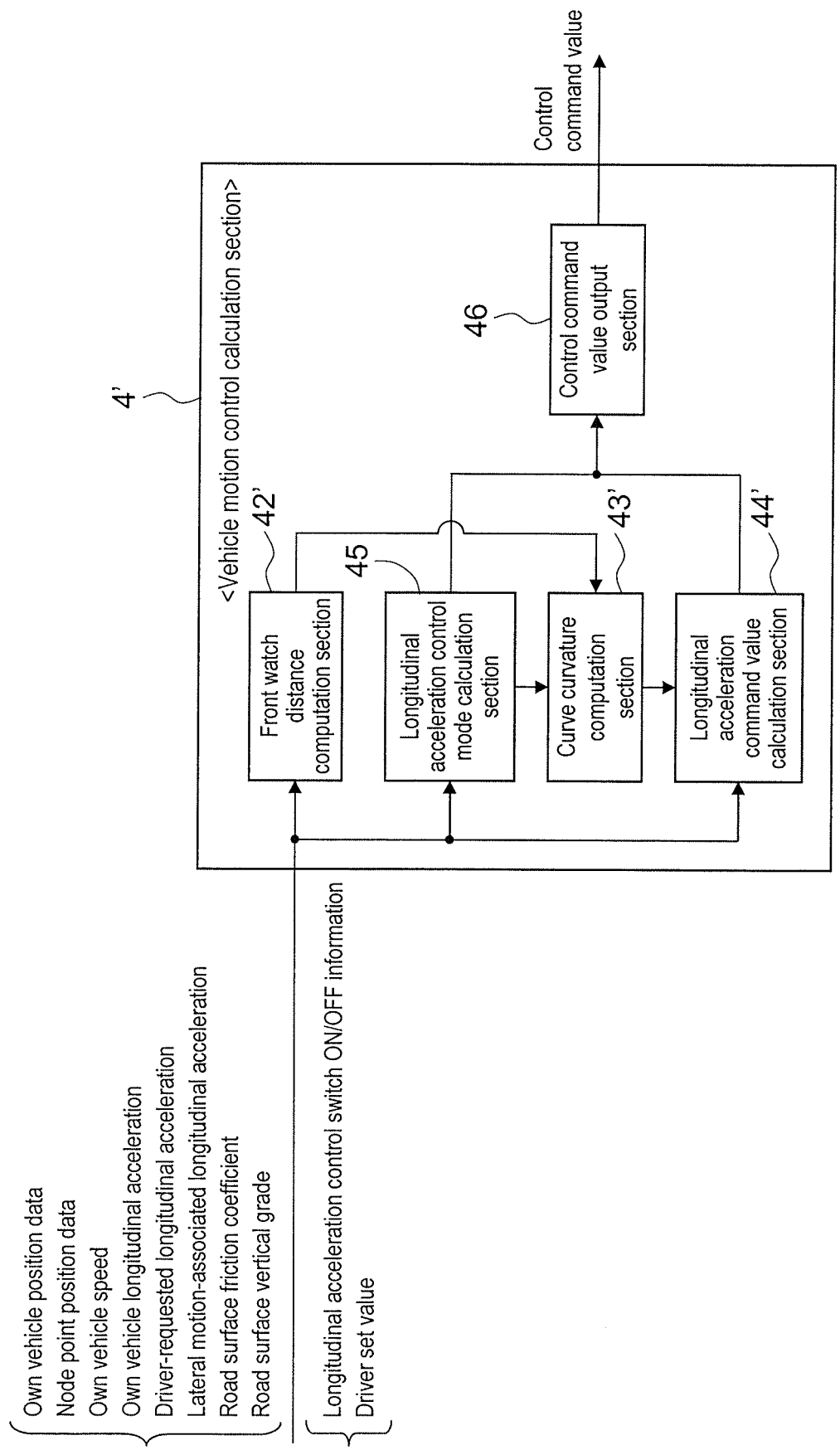
FIG. 23 is a view showing an example of a vehicle motion control calculation section of the vehicle motion control system shown in FIG. 22.

The vehicle motion control calculation section 4' includes, as shown in FIG. 23, a front watch distance computation section 42' for computing a front watch distance from the position of the own vehicle to a front watch point, a longitudinal acceleration control mode calculation section 45 for calculating a longitudinal acceleration control mode based on the longitudinal acceleration control switch ON/OFF information, a speed of the own vehicle, a curve shape, a position of the own vehicle and a lateral motion-associated longitudinal acceleration, a curve curvature computation section 43' for computing a curve curvature and a temporal change of the curve curvature in the front watch distance based on the calculated longitudinal acceleration control mode, a longitudinal acceleration command value calculation section 44' for calculating a longitudinal acceleration command value based on the curve curvature and the temporal change of the curve curvature in the front watch distance, and the vehicle speed, and a control command value output section 46 for outputting a control command value for implementing the calculated longitudinal acceleration command value based on the calculated longitudinal acceleration control mode. The vehicle motion control calculation section 4' also includes a proportional gain calculation section for calculating a proportional gain for changing the longitudinal acceleration command value based on at least one of the maximum lateral acceleration estimate, the grade of the road ahead of the own vehicle excluding a vertical grade, the pedal operation by the driver, and the turning direction.

Figure 24:
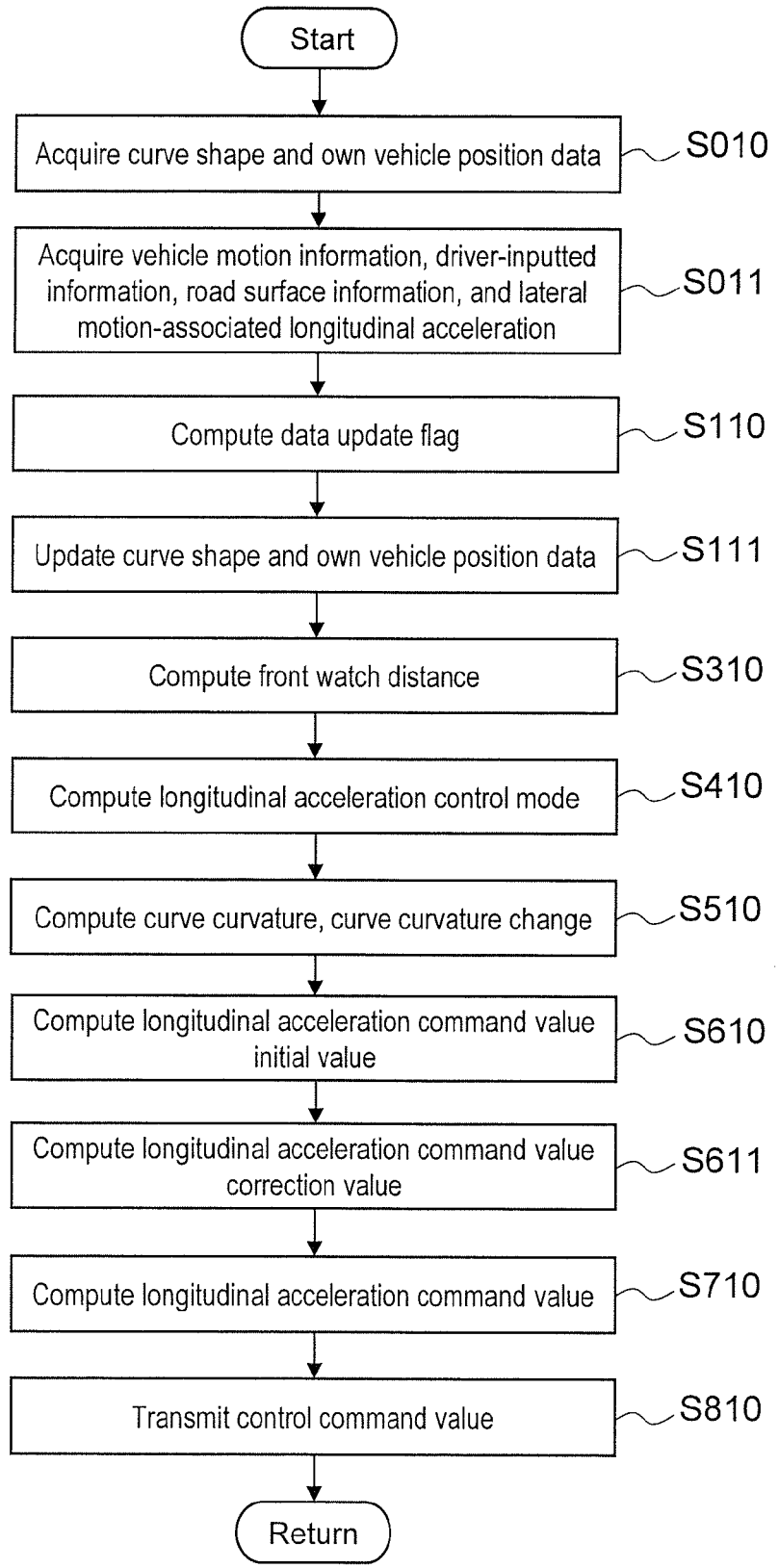
FIG. 24 is a view showing a flowchart of the vehicle motion control system of FIG. 22.

FIG. 24 shows a calculation flowchart in the vehicle motion control system 1' of the second embodiment.

In step S010, curve shape and own vehicle position data are acquired and calculated in the same way as in the first embodiment 1. After calculation, the procedure proceeds to step S011.

In step S011, vehicle motion information including a vehicle speed V, a longitudinal acceleration $G_x$, a driver-requested longitudinal acceleration $G_{xDrvREQ}$, a lateral motion-associated longitudinal acceleration $G_{xGVC}$, a road surface friction coefficient μ, a road surface vertical grade Grad, a longitudinal acceleration control switch ON/OFF information $F_{ctrlsw}$ and a driver set value $G_{DrvSet}$, as well as driver-inputted information, road surface information, and a lateral motion-associated longitudinal acceleration are acquired. In the case where these values are not directly acquired but acquired through estimation as mentioned above, data required for estimation are acquired and calculation is performed therewith. After calculation, the procedure proceeds to step S110.

In step S110, it is determined whether or not the own vehicle position data $P_v$ ($X_v$, $Y_v$) by GPS is updated in the same way as in the first embodiment. If the data is updated, a data update flag $F_{GPSref}$ is set to 1. If not, the data update flag $F_{GPSref}$ is set to 0. After calculation, the procedure proceeds to step S111.

In step S111, the curve shape and own vehicle position data obtained in step S010 are updated. When the data update flag calculated in step S110 is 0, i.e., when the own vehicle position data by GPS acquired in step S010 is not updated and only the data such as the vehicle motion information acquired in step S011 is updated, the curve shape and own vehicle position data are updated based on the curve shape and own vehicle position data obtained in step S010 and the travel distance of the own vehicle calculated with use of the own vehicle speed V obtained from the vehicle motion information.

For example, it is assumed that the data update flag is 1, i.e., data update by GPS is performed, at a certain time t0. The curve shape data obtained at this time is defined as $P_{t0\_n}$ ($X_{t0\_n}$, $Y_{t0\_n}$) (n is an integer from 0 to nmax_t0), and the own vehicle position data is defined as $P_{t0\_V}$ ($X_{t0\_V}$, $Y_{t0\_V}$).

Figure 25:
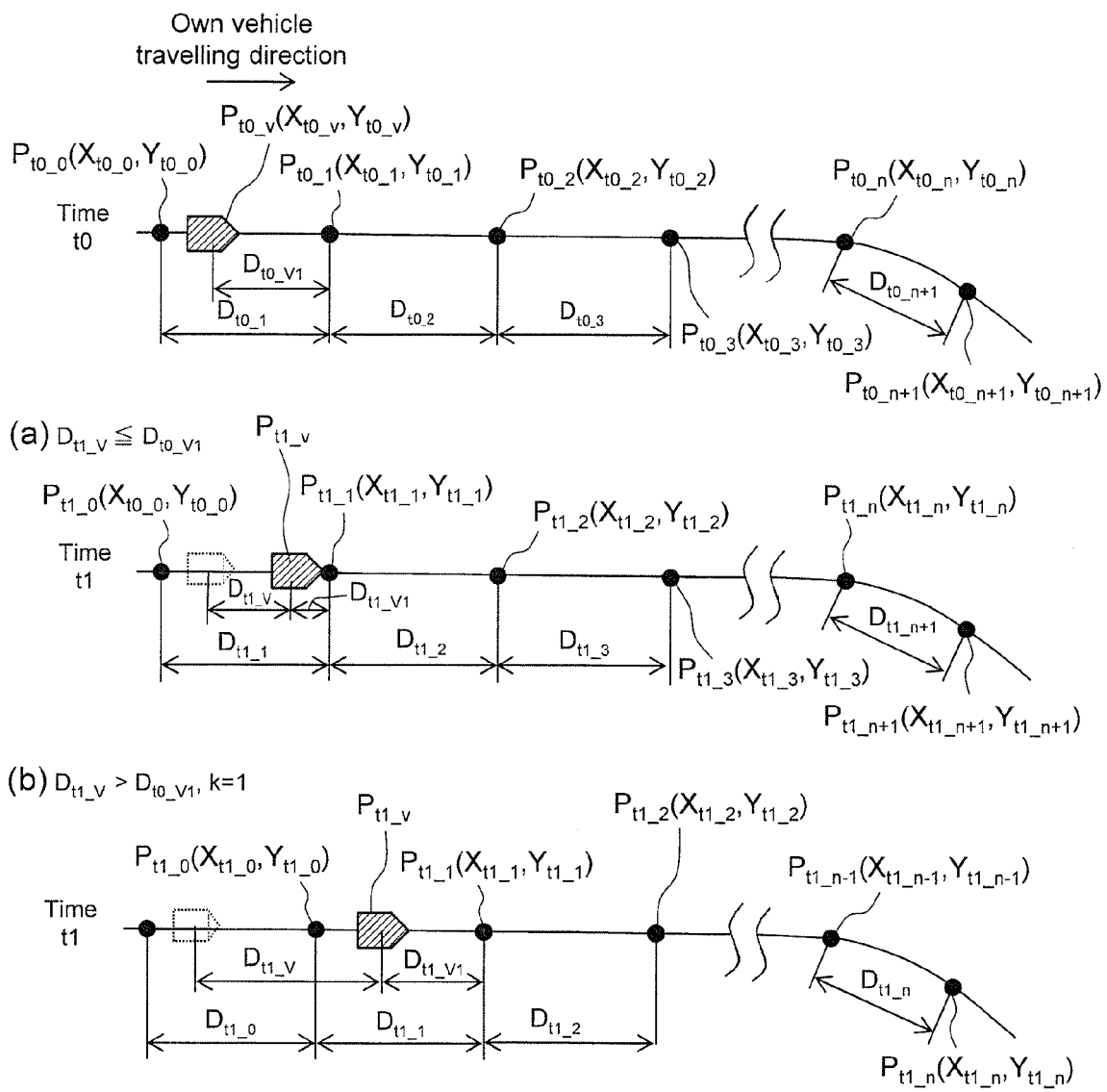
FIG. 25 is a concept view showing the relation between an own vehicle position and node point positions in the vehicle motion control system of FIG. 22.

As shown in FIG. 25, a distance between node points $P_{t0\_n}$ and $P_{t0\_n+1}$ in this case is defined as $D_{t0\_n+1}$, and a distance between an own vehicle position $P_{t0\_V}$ and a node point $P_{t0\_1}$ is defined as $D_{t0\_V1}$. In the calculation at t1 that is $\Delta t_v$ after t0, if the data update flag is 0, i.e., if data update by GPS is not performed and only the update of vehicle motion information and the like is performed, then a travel distance $D_{t1\_V}$ of the own vehicle is computed from the vehicle speed V and $\Delta t_v$, and thereby a positional relation between the own vehicle position and each node point is updated.

In the present embodiment, the first node point present on the opposite side of the travelling direction of the own vehicle is set to $P_0$ as described before. Accordingly, number n of each node point is changed by the size relation of $D_{t1\_V}$ and $D_{t0\_V1}$. When $D_{t1\_V}$ is equal to or less than $D_{t0\_V1}$, the own vehicle position is still between the node points $P_{t0\_0}$ and $P_{t0\_1}$ at t1 as shown in FIG. 25A. Consequently, each of the node points, a distance between each node point, a maximum value nmax_t1 of the node point number, and $D_{t1\_V1}$ at t1 are given by the following Formulas (22) to (25).

$$P_{t1\_n}(X_{t1\_n}, Y_{t1\_n}) = P_{t0\_n}(X_{t0\_n}, Y_{t0\_n}) \text{ (n is an integer from 0 to nmax\_t0)} \quad (22)$$

$$D_{t1\_n} = D_{t0\_n} \text{ (n is an integer from 0 to nmax\_t0)} \quad (23)$$

$$n\text{max\_}t1 = n\text{max\_}t0 \quad (24)$$

$$D_{t1\_V1} = D_{t0\_V1} - D_{t1\_V} \quad (25)$$

When $D_{t1\_V}$ is larger than $D_{t0\_V1}$, the own vehicle position is ahead of the node point $P_{t0\_1}$ at t1. Therefore, each node point, the distance between each node point, and $D_{t1\_V1}$ at t1 are given by the following Formulas (26) to (29).

$$P_{t1\_n}(X_{t1\_n}, Y_{t1\_n}) = P_{t0\_n+k}(X_{t0\_n+k}, Y_{t0\_n+k}) \quad (26)$$
$$(n \text{ is an integer from 0 to nmax\_t0})$$

$$D_{t1\_n} = D_{t0\_n+k} \quad (n \text{ is an integer from 0 to nmax\_t0}) \quad (27)$$

$$n\max\_t1 = n\max\_t0 - k \quad (28)$$

$$\begin{cases} D_{t1\_V1} = D_{t0\_V1} + \sum_{j=2}^{k+1} D_{t0\_Vj} - D_{t1\_V} & (1 \leq k \leq n\max\_t0 - 1) \\ D_{t1\_V1} = 0 & (k = n\max\_t0) \end{cases} \quad (29)$$

Here, k represents a minimum integer with which $D_{t1\_V1}$ obtained by Formula (29) is 0 or more and nmax_t1 is positive.

For example, k is 1 when the own vehicle position is between the node points $P_{t0\_1}$ and $P_{t0\_2}$ as shown in FIG. 25B. When the value of k which fulfills the aforementioned condition is not present in the curve shape data obtained in step S010, then nmax_t0 is set as k. If the data update flag is 1, data at each node point and own vehicle position data acquired in step S010 are defined as curve shape data and own vehicle position data. After calculation, the procedure proceeds to step S310.

In step S310, the front watch distance is calculated by the front watch distance computation section 42' shown in FIG. 23. As in the first embodiment, three front watch points PP0, PP1 and PP2 are set on the course in the travelling direction of the own vehicle at positions ranging from a position extremely near the own vehicle to a position distanced from the own vehicle. Front watch distances $L_{PP0}$, $L_{PP1}$ and $L_{PP2}$ from the own vehicle to the front watch points PP0, PP1 and PP2 are computed.

The front watch distances $L_{PP0}$, $L_{PP1}$ and $L_{PP2}$ may be values preset to satisfy the relation of the foregoing Formula (10), or may each be provided as shown in the above Formula (11) with use of preset front watch time $T_{PP0}$, $T_{PP1}$ and $T_{PP2}$ (provided that $T_{PP0}<T_{PP1}<T_{PP2}$) and the vehicle speed V.

The front watch distance $L_{PP0}$, $L_{PP1}$ and $L_{PP2}$ may be changed according to the road surface friction coefficient μ. For example, if the road surface friction coefficient μ is equal to or less than a given specified value, the front watch distance $L_{PP0}$, $L_{PP1}$ and $L_{PP2}$ may be changed so that they are longer as the road surface friction coefficient μ is smaller. It is to be noted that the front watch point PP0 is a watch point extremely near the own vehicle and that $L_{max}$ is a value obtained by adding a distance from the own vehicle position to the node point position $P_1$ and a distance between respective node points from the node point position $P_1$ to the node point position $P_{nmax}$. After calculation, the procedure proceeds to step S410.

In step S410, the longitudinal acceleration control mode calculation section 45 shown in FIG. 23 calculates a longitudinal acceleration control mode $G_{xMode}$. The longitudinal acceleration control mode $G_{xMode}$ is a value set so that if the value is 0, longitudinal acceleration control is not performed, if the value is 1, longitudinal acceleration control is performed based on the lateral motion-associated longitudinal acceleration $G_{xGVC}$, and further if the value is 2, longitudinal acceleration control is performed based on the lateral motion-associated longitudinal acceleration $G_{xGVC}$, own vehicle position data and curve shape data.

The longitudinal acceleration control mode $G_{xMode}$ may be created in the following method. For example, it is assumed that longitudinal acceleration control switch ON/OFF information $F_{ctrlsw}$ when the longitudinal acceleration control switch is OFF is defined as 0, and $F_{ctrlsw}$ when the longitudinal acceleration control switch is ON is defined as 1. When $F_{ctrlsw}$ is 0, the longitudinal acceleration control mode $G_{xMode}$ is set to 0.

The longitudinal acceleration control mode $G_{xMode}$ may also be set to 0 according to the vehicle speed V.

For example, a minimum vehicle speed for start of control is set in advance. If the vehicle speed V is smaller than the minimum vehicle speed, then the longitudinal acceleration control mode $G_{xMode}$ is set to 0.

Moreover, when the lateral motion-associated longitudinal acceleration $G_{xGVC}$ is difficult to acquire and the own vehicle position data and curve shape data are also difficult to acquire, the longitudinal acceleration control mode $G_{xMode}$ is set to 0. When there is no condition to set the longitudinal acceleration control mode $G_{xMode}$ to 0, the longitudinal acceleration control mode $G_{xMode}$ is set to 1 or 2 according to the state of the curve shape data and own vehicle position data.

For example, if a period of time when the data update flag $F_{GPSref}$ is set to 0 is equal to or more than a predetermined time, it is determined that acquisition of the own vehicle position data by GPS is difficult and so the longitudinal acceleration control mode $G_{xMode}$ is set to 1. When $D_{t1\_v1}$ calculated in the Formula (29) in step S111 is 0, the longitudinal acceleration control mode $G_{xMode}$ is set to 1. Moreover, in the case where a deviation between a travel locus based on the own vehicle position data and a course shape that the own vehicle assumedly is traveling on the map data is large, it is determined that the travel course of the own vehicle on the map data is different from an actual course and so the longitudinal acceleration control mode $G_{xMode}$ is set to 1.

Moreover, in the case where lateral motion information such as a steering angle, a yaw rate and a lateral acceleration may be obtained in addition to the vehicle speed V as vehicle motion information, a travel locus estimated from these values and an own vehicle position locus obtained by GPS are respectively calculated. If a deviation between these loci is large, it is determined that the precision of GPS is deteriorated and so the longitudinal acceleration control mode $G_{xMode}$ is set to 1. Under the conditions other than the above, the longitudinal acceleration control mode $G_{xMode}$ is set to 2.

Accordingly, even in the situation where data acquisition by GPS is difficult, longitudinal acceleration control based on the lateral motion-associated longitudinal acceleration $G_{xGVC}$ can be implemented. After calculation, the procedure proceeds to step S510.

In step S510, the curve curvature computation section 43' shown in FIG. 23 calculates a curve curvature and a curve curvature change in the same way as in step S500 of the aforementioned first embodiment if the longitudinal acceleration control mode $G_{xMode}$ is 2. Otherwise, both the curve curvature and the curve curvature change are set to 0. After calculation, the procedure proceeds to step S610.

In step S610, the longitudinal acceleration command value calculation section 44' shown in FIG. 23 creates a longitudinal acceleration command value initial value based on the curve curvatures $\kappa_{PP0}$, $\kappa_{PP1}$ and $\kappa_{PP2}$ and the curve curvature changes $d\kappa_{PP0}/dx$, $d\kappa_{PP1}/dx$, $d\kappa_{PP2}/dx$ in the front watch distances $L_{PP0}$, $L_{PP1}$ and $L_{PP2}$, and the vehicle speed V. The longitudinal acceleration command values $G_{xREQiniPP0}$ and $G_{xREQiniPP1}$ based on the curve curvature changes $d\kappa_{PP0}/dx$ and $d\kappa_{PP1}/dx$ in the vicinity of the vehicle are computed by the aforementioned Formula (6). A longitudinal acceleration command value $G_{xREQiniPP2}$ based on the curve curvature $\kappa_{PP2}$ at a distance from the vehicle is computed by the aforementioned Formula (7).

In the case where the front watch distances $L_{PP0}$, $L_{PP1}$ and $L_{PP2}$ are created with the front watch time $T_{PP0}$, $T_{PP1}$ and $T_{PP2}$ shown in the aforementioned Formula (11), movement speeds $V_{PP0}$, $V_{PP1}$ and $V_{PP2}$ of the front watch points PP0, PP1 and PP2 are given by the aforementioned Formula (20) with use of the longitudinal acceleration $G_x$. Based on the resultant values, the longitudinal acceleration command values $G_{xREQiniPP0}$ and $G_{xREQiniPP1}$ are calculated by the aforementioned Formula (21). The longitudinal acceleration command value $G_{xREQiniPP2}$ is calculation by the aforementioned Formula (7). In the formula, $C_{xy0}$, $C_{xy1}$, and $C_x$ are values variable according to the road surface friction coefficient μ and the driver-requested longitudinal acceleration $G_{xDrvREQ}$.

These values are set by using, for example, values $C_{xy0\_ini}$, $C_{xy1\_ini}$, and $C_{x\_ini}$ preset as constants when $d\kappa_{PP}m/dx$ is positive, a correction coefficient kμ, based on the road surface friction coefficient μ, and a correction coefficient $kG_{xDrv}$ based on the driver-requested longitudinal acceleration $G_{xDrvREQ}$ in the following Formulas (30) to (31).

$$C_{xym} = k\mu \cdot kG_{xDrv} \cdot C_{xym_{ini}} (m=0,1) \tag{30}$$

$$C_x = kG_{xDrv} \cdot C_{x\_ini} \tag{31}$$

The correction coefficient kμ and $kG_{xDrv}$ take values of 0 to 1. The correction coefficient kμ is set to be smaller in an area where the road surface friction coefficient μ is small than in an area where μ is large. When the driver-requested longitudinal acceleration $G_{xDrvREQ}$ is equal to or more than a given value, the correction coefficient $kG_{xDrv}$ is set to decrease in response to the increase of $G_{xDrvREQ}$ and is set to be 0 in the end. When $G_{xREQiniPP2}$ is calculated, the values of $G_{ySET}$ and $G_{xREQfar\_min}$ in Formula (7) are changed according to the road surface friction coefficient μ. For example, when the road surface friction coefficient μ is equal to or less than a given value, the values of $G_{ySET}$ and $G_{xREQfar\_min}$ are changed to smaller values.

As described in the first embodiment, $C_{xy0}$, $C_{xy1}$ and $C_x$ may be calculated by integrating correction gains, among the correction gains shown in aforementioned FIG. 6 except the correction gain based on the vertical grade, to preset constants $C_{xy00}$, $C_{xy10}$ and $C_{x0}$. Here, the constants $C_{xy00}$, $C_{xy10}$ and $C_{x0}$ when $d\kappa_{PPm}/dx$ is positive may be different from those when $d\kappa_{PPm}/dx$ is negative. After calculation, the procedure proceeds to step S611.

In S611, a longitudinal acceleration command value correction value $G_{xREQhoseiPPm}$ (m=0, 1, 2) is created by correcting the longitudinal acceleration command value initial value with use of the road surface vertical grade Grad. The longitudinal acceleration command value correction value is given by the following Formula (32) with use of a longitudinal acceleration $G_{xGrad}$ generated for the vehicle by the road surface vertical grade Grad.

$$\begin{cases} G_{xREQhoseiPPm} = G_{xREQiniPPm} - & (G_{xREQiniPPm} \neq 0) \quad (m = 0, 1, 2) \\ G_{xGrad} \\ G_{xREQhoseiPPm} = 0 & (G_{xREQiniPPm} = 0) \quad (m = 0, 1, 2) \end{cases} \quad (32)$$

According to the formula, the longitudinal acceleration $G_{xGrad}$ is a value which is negative on the ascending grade and which is positive on the descending grade.

Thus, in the second embodiment, the method for implementing correction by adding correction gains based on the vertical grade has been described. However, as shown in the aforementioned FIG. 6, correction may be implemented not by adding but by integrating the correction gains based on the vertical grade. After calculation, the procedure proceeds to step S710.

Figure 26:
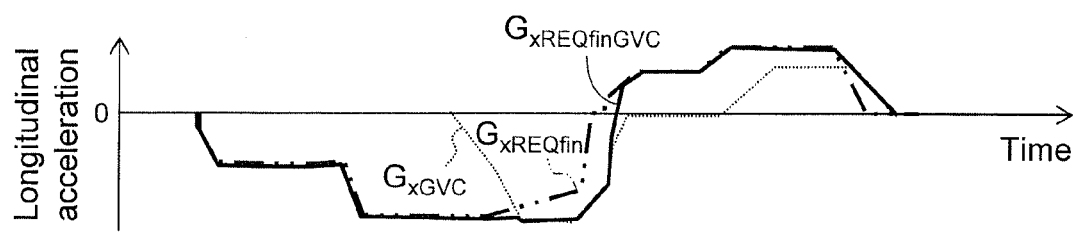
FIG. 26 is a view showing a temporal change of a longitudinal acceleration in the vehicle motion control system of FIG. 22.

In step S710, processing of longitudinal acceleration control with an intervention threshold, filtering, selection processing, summing processing and so forth are applied to the longitudinal acceleration command value correction values $G_{xREQhoseiPP0}$, $G_{xREQhoseiPP1}$ and $G_{xREQhoseiPP2}$, and a value $G_{xREQfin}$ obtained thereby is further combined with the lateral motion-associated longitudinal acceleration $G_{xGVC}$ to create a final longitudinal acceleration command value $G_{xREQfinGVC}$. Calculation of the longitudinal acceleration command value $G_{xREQfin}$ is performed by using $G_{xREQiniPP0}$, $G_{xREQiniPP1}$ and $G_{xREQiniPP2}$ in the calculation of step S700 shown in the aforementioned first embodiment as $G_{xREQhoseiPP0}$, $G_{xREQhoseiPP1}$ and $G_{xREQhoseiPP2}$ and performing the same calculation therewith. The longitudinal acceleration command value $G_{xREQfin}$ and the lateral motion-associated longitudinal acceleration $G_{xGVC}$ are combined in the following method. For example, as shown in FIG. 26, when both of the values have the same sign, one with a larger absolute value is asserted as $G_{xREQfinGVC}$, whereas when the values have different signs, a value obtained by adding both of the values is used as $G_{xREQfinGVC}$.

In adding both of the values, weighting may be applied thereto.

As a calculation method of the longitudinal acceleration command value $G_{xREQfinGVC}$, the method has been described in which $G_{xREQfin}$ is calculated and then combined with $G_{xGVC}$. However, this method is not restrictive and only illustrative. For example, instead of the longitudinal acceleration command value correction value $G_{xREQhoseiPP0}$ at the front watch point PP0 which is extremely near the own vehicle at the time of calculating $G_{xREQfin}$, $G_{xGVC}$ may be used to calculate $G_{xREQfin}$, and a value obtained thereby may be used as the longitudinal acceleration command value $G_{xREQfinGVC}$. After calculation, the procedure proceeds to step S810.

In step S810, the control command value output section 46 shown in FIG. 23 transmits a command value for implementing the longitudinal acceleration command value $G_{xREQfinGVC}$ to the longitudinal acceleration generation section 5 if the longitudinal acceleration control mode is 1 or 2. If the longitudinal acceleration control mode is 0, the control command value output section 46 transmits a command value for disabling longitudinal acceleration control thereto. At the same time, an information presentation command value corresponding to the longitudinal acceleration control state is transmitted to the information presenter 10.

As for a signal transmitted when the longitudinal acceleration control mode is other than 0, the longitudinal acceleration command value $G_{xREQfinGVC}$ is transmitted as a control command value in the case where the longitudinal acceleration command value $G_{xREQfinGVC}$ is transmitted and the longitudinal acceleration generation section 5 can implement the received longitudinal acceleration command value $G_{xREQfinGVC}$ as described before.

When a command value needs to be customized to the longitudinal acceleration generation section 5, a command value for controlling the longitudinal acceleration generation section 5 is created based on the longitudinal acceleration command value $G_{xREQfinGVC}$ and is transmitted. For example, when the longitudinal acceleration generation section 5 is a hydraulic friction brake, and longitudinal acceleration control is performed by sending a hydraulic pressure command value to a hydraulic friction-brake controller, the hydraulic pressure command value is created based on the longitudinal acceleration command value $G_{xREQfinGVC}$, and the created hydraulic pressure command value is transmitted as a control command value. Accordingly, a longitudinal acceleration based on the longitudinal acceleration command value $G_{xREQfinGVC}$ can be generated for the vehicle.

As mentioned above, a command for implementing a longitudinal acceleration command value may be transmitted to a plurality of longitudinal acceleration generation section 5. For example, the longitudinal acceleration generation section 5, which implements the longitudinal acceleration created based on the longitudinal acceleration command value $G_{xREQhoseiPP2}$ in the case where the own vehicle position is at a distance from a curve, may be embodied by the change gear or an engine, or embodied by both the entities, while a hydraulic pressure friction brake may be further added as the longitudinal acceleration generation section 5 which implements the longitudinal acceleration created based on the longitudinal acceleration command values $G_{xREQhoseiPP1}$, $G_{xREQhoseiPP0}$ and $G_{xGVC}$ in the vicinity of the curve.

This makes it possible to achieve relatively constant deceleration at a distance from a curve with the engine brake by changing a throttle opening of the engine and by changing a gear ratio of the change gear, while achieving deceleration of a large change in the vicinity of the curve with the hydraulic pressure friction brake. This makes it possible to implement the deceleration similar to the deceleration conducted by the driver. That is, when the driver visually recognizes a curve with a moderately large curve curvature in the travelling direction at a distance from the curve, the driver turns off an accelerator and conducts deceleration with an engine brake, and after clearly recognizing the curve curvature change in the vicinity of the curve, the driver operates the brake to decelerate the vehicle.

As a command value sent to the information presenter 10, a drive command value for informing the driver that longitudinal acceleration control is in operation is transmitted to an indicator or a sound generator for example. When the longitudinal acceleration control mode is 1, a drive command value for informing the driver of inexecution of deceleration before the curve and the reason thereof is transmitted to the indicator or the sound generator.

The preset values (e.g., front watch time $T_{PP0}$, $T_{PP1}$, $T_{PP2}$ and lateral acceleration set value $G_{ySET}$) used in the second embodiment may be changed according to a driver set value $G_{DrvSet}$. For example, it is presumed that the driver set value $G_{DrvSet}$ takes the value of 0 to 10. When the driver set value $G_{DrvSet}$ is 0, the longitudinal acceleration control started before the curve with use of the front watch point is not performed and only the longitudinal acceleration control with the lateral motion-associated longitudinal acceleration $G_{xGVC}$ may be executed. When a deceleration at a distance is presumed to increase as the driver set value $G_{DrvSet}$ is larger, the front watch time $T_{PP0}$, $T_{PP1}$ and $T_{PP2}$ may take very small values if the driver set value $G_{DrvSet}$ is 0. As the driver set value $G_{DrvSet}$ increases, the front watch time $T_{PP2}$ may take a larger value while the lateral acceleration set value $G_{ySET}$ may take a smaller value. Since the deceleration at a distance from the curve is changed thereby, the deceleration start timing before the curve and the deceleration amount can be changed according to the preference of the driver. The amount of deceleration to be generated may be changed not by changing the front watch time $T_{PP0}$, $T_{PP1}$ and $T_{PP2}$ but by changing $G_{yset1}$, $G_{yset2}$, $G_{yset3}$, $G_{yset4}$ and $G_{yset5}$ as well as $C_{adjGy1}$ and $C_{adjGy2}$ shown in the aforementioned FIG. 8 according to the driver set value $G_{DrvSet}$.

As shown in the foregoing, in the second embodiment, the vehicle motion information and the road surface information are used for changing a deceleration pattern from the deceleration performed when the own vehicle position is distant from the curve to the deceleration performed when the own vehicle position is near the curve. This makes it possible to implement the longitudinal acceleration control which further satisfies driving feeling of the driver. Further, since proportional gains are corrected with use of the maximum lateral acceleration estimate and other information including the accelerator operation by the driver, the road horizontal grade and the turning direction, driving feeling of the driver can be further enhanced.

Third Embodiment

Hereinafter, a configuration and operation of a vehicle motion control system according to a third embodiment of the present invention and a modification thereof will be explained with reference to FIGS. 27 and 28. It is to be noted that component members identical to those in the first and second embodiments are designated by identical reference signs to omit detailed description.

First, a description will be given of the configuration of the vehicle motion control system according to the third embodiment of the present invention with reference to FIG. 27.

Figure 27:
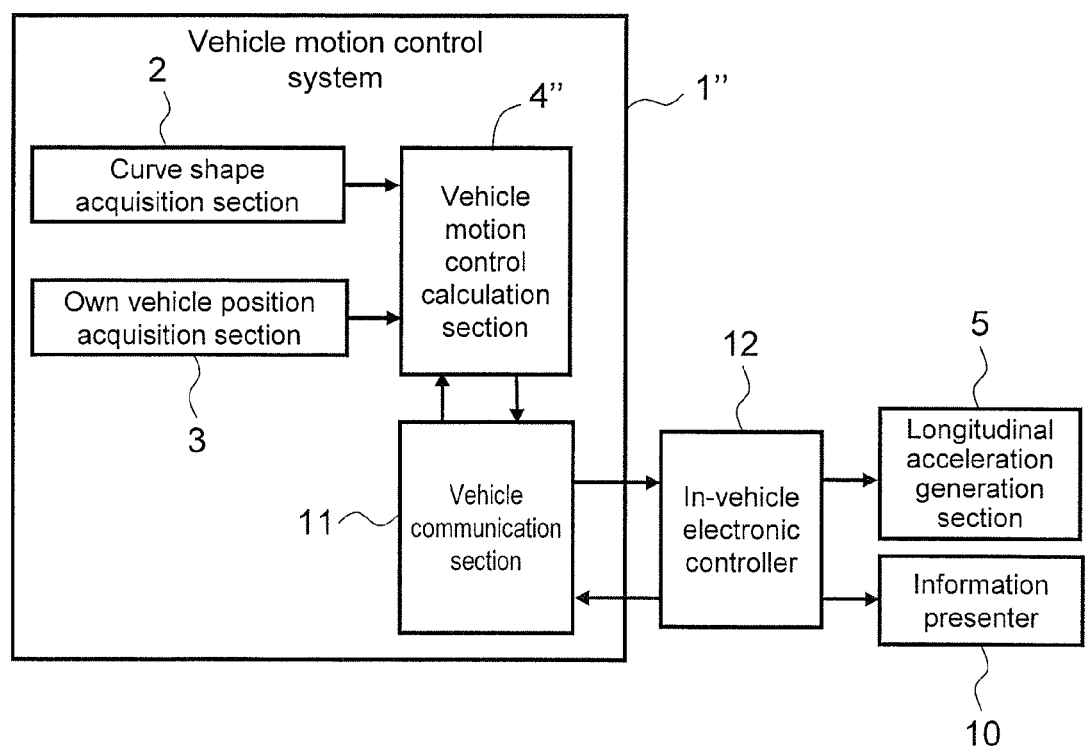
FIG. 27 is a view showing an example of a third embodiment of the vehicle motion control system according to the present invention.

FIG. 27 is a system block diagram showing the configuration of the vehicle motion control system according to the third embodiment of the present invention.

A vehicle motion control system 1" of the third embodiment includes a curve shape acquisition section 2 for acquiring the curve shape ahead of an own vehicle, an own vehicle position acquisition section 3 for acquiring a position of the own vehicle, a vehicle communication section 11 to communicate with an in-vehicle electronic controller 12, a vehicle motion control calculation section 4" for calculating a longitudinal acceleration to be generated for the vehicle based on the information acquired by the curve shape acquisition section 2, the own vehicle position acquisition section 3 and the vehicle communication section 11.

A calculation result of the vehicle motion control calculation section 4" is sent to a longitudinal acceleration generation section 5 and an information presenter 10 via the vehicle communication section 11 and the in-vehicle electronic controller 12, by which an actuator which can generate a longitudinal acceleration for the vehicle is driven. In this case, the in-vehicle electronic controller 12 is a means to communicate with the vehicle motion control system 1" and is also an in-vehicle electronic controller which can drive-control the longitudinal acceleration generation section 5 and the information presenter 10. In drive control of the longitudinal acceleration generation section 5, the in-vehicle electronic controller 12 may directly drive-control an acceleration/deceleration actuator for generating the longitudinal acceleration for the vehicle or may drive-control the acceleration/deceleration actuator through communication with an electronic controller which controls the acceleration/deceleration actuator. Similarly, in drive control of the information presenter 10, the in-vehicle electronic controller 12 may directly drive-control the information presenter, or may drive control the information presenter through communication with an electronic controller which controls the information presenter. The vehicle motion control system 1" of the third embodiment does not necessarily need to be incorporated in the vehicle, but may be shaped so that the driver can easily take it out. Thus, providing the in-vehicle electronic controller 12 makes it possible to downsize the vehicle motion control systems 1".

Since the curve shape acquisition section 2, the own vehicle position acquisition section 3 for acquiring an own vehicle position, the longitudinal acceleration generation section 5 and the information presenter 10 are similar to those in the aforementioned first and second embodiments, the detailed description thereof will be omitted.

The vehicle motion control calculation section 4" creates a command value of the longitudinal acceleration to be generated for the vehicle based on the information acquired by the curve shape acquisition section 2, the own vehicle position acquisition section 3 and the vehicle communication section 11, and communicates with the in-vehicle electronic controller 12 via the vehicle communication section 11 to perform longitudinal acceleration control of the vehicle. Since the method for creating the longitudinal acceleration command value in the present embodiment is similar to that in the aforementioned first embodiment, the description thereof will be omitted.

The vehicle communication section 11 is a means to communicate with the in-vehicle electronic controller 12 mounted in the vehicle. For example, the vehicle communication section 11 may be a method for communicating with an electronic controller mounted on the vehicle by connecting the vehicle motion control system 1" and the in-vehicle electronic controller 12 with a connector. The vehicle communication section 11 may also be a method for communicating with the in-vehicle electronic controller 12 by wireless communications in which an identification sign of the vehicle motion control system 1″ is registered in advance onto the in-vehicle electronic controller 12 mounted on the vehicle.

Figure 28:
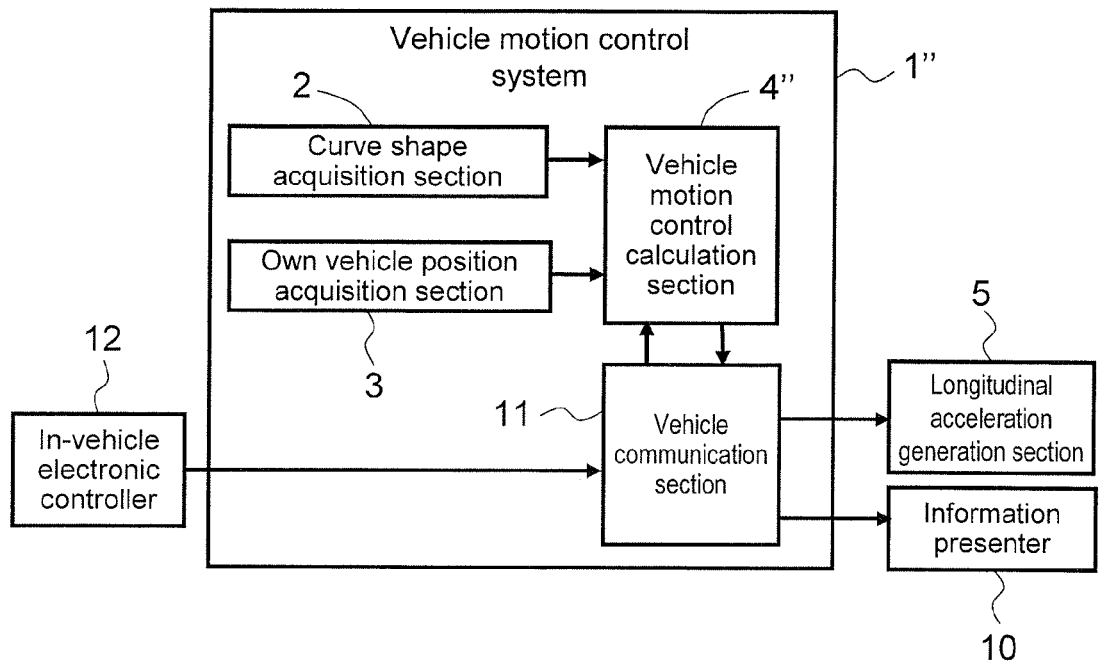
FIG. 28 is a view showing another example of the third embodiment of the vehicle motion control system according to the present invention.

When the longitudinal acceleration generation section 5 and the information presenter 10 have a means to communicate with the vehicle communication section 11, the vehicle motion control system 1″ may directly communicate with the longitudinal acceleration generation section 5 and the information presenter 10 via the vehicle communication section 11 to drive-control the longitudinal acceleration generation section 5 and the information presenter 10 as a modification of the third embodiment as shown in FIG. 28.

This makes it possible to incorporate the present embodiment into GPS-mounted cellular phones, small-size portable navigational devices and the like. As a consequence, the driver can implement longitudinal acceleration control of the present embodiment by bringing his/her own cellular phone or small-size portable navigational device into the vehicle.

Fourth Embodiment

Hereinafter, a configuration and operation of a vehicle motion control system according to a fourth embodiment of the present invention will be explained with reference to FIG. 29. It is to be noted that component members identical to those in the first to third embodiments are designated by identical reference signs to omit detailed description.

Figure 29:
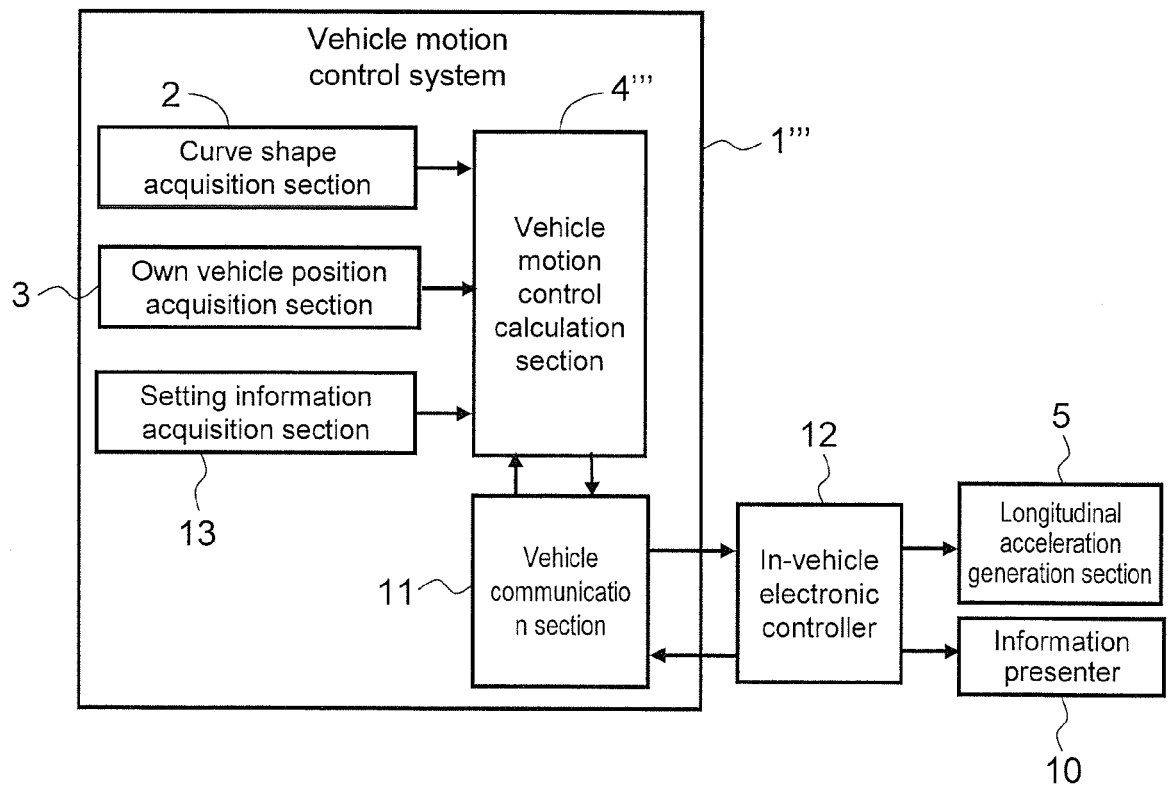
FIG. 29 is a view showing a fourth embodiment of the vehicle motion control system according to the present invention.

FIG. 29 is a system block diagram showing the configuration of the vehicle motion control system according to the fourth embodiment of the present invention.

A vehicle motion control system 1‴ of the fourth embodiment includes a curve shape acquisition section 2 for acquiring a curve shape ahead of an own vehicle, an own vehicle position acquisition section 3 for acquiring a position of the own vehicle, a vehicle communication section 11 to communicate with an in-vehicle electronic controller 12, and a setting information acquisition section 13. The vehicle motion control system 1‴ also includes a vehicle motion control calculation section 4‴ for calculating a longitudinal acceleration to be generated for the vehicle based on the information acquired by the curve shape acquisition section 2, the own vehicle position acquisition section 3, the setting information acquisition section 13 and the vehicle communication section 11.

A calculation result of the vehicle motion control calculation section 4‴ is sent to a longitudinal acceleration generation section 5 and an information presenter 10 via the vehicle communication section 11 and the in-vehicle electronic controller 12, by which an actuator which can generate a longitudinal acceleration for the vehicle is driven. The vehicle motion control system 1‴ of the fourth embodiment does not necessarily need to be incorporated in the vehicle, but may be shaped so that the driver can easily take it out.

Since the curve shape acquisition section 2, the own vehicle position acquisition section 3 for acquiring an own vehicle position, the longitudinal acceleration generation section 5, the information presenter 10, the vehicle communication section 11 and the in-vehicle electronic controller 12 are similar to those in the aforementioned first, second and third embodiments, the detailed description thereof will be omitted.

The setting information acquisition section 13 acquires setting information on the constants which can be set by the driver, such as the aforementioned front watch time $T_{PP0}$, $T_{PP1}$ and $T_{PP2}$, and the lateral acceleration set value $G_{ySET}$. When the system has a plurality of control modes each consisting of a combination of some preset constants, the setting information acquisition section 13 acquires the setting information selected by each control mode. For example, the front watch time $T_{PP0}$, $T_{PP1}$ and $T_{PP2}$ and the lateral acceleration set value $G_{ySET}$ may directly be inputted by the driver within a certain range, and the inputted values may be used as the setting information.

The system may have control modes such as "sport mode" and "normal mode" each consisting of a combination of some constants, and the constants corresponding to the control mode selected by the driver may be used as the setting information.

The vehicle motion control calculation section 4‴ includes a means to store the setting information acquired by the setting information acquisition section 13. The vehicle motion control calculation section 4‴ creates a command value of the longitudinal acceleration to be generated for the vehicle based on the information acquired by the curve shape acquisition section 2, the own vehicle position acquisition section 3, the setting information acquisition section 13 and the vehicle communication section 11, and communicates with the in-vehicle electronic controller 12 via the vehicle communication section 11 to perform longitudinal acceleration control of the vehicle. Since the method for creating the longitudinal acceleration command value in the present embodiment is similar to that in the aforementioned first and second embodiment, the description thereof will be omitted.

This makes it possible to incorporate the present embodiment into GPS-mounted cellular phones, small-size portable navigational devices and the like, and also allows change of setting by every driver. Accordingly, even in the case where a plurality of persons share one vehicle, each driver can bring a cellular phone or a small-size portable navigational device having the constants set by himself/herself into the vehicle, so that each driver can implement the longitudinal acceleration control of the present embodiment with his/her own setting.

Fifth Embodiment

Hereinafter, a configuration and operation of a vehicle motion control system according to a fifth embodiment of the present invention will be explained with reference to FIGS. 30 to 34.

The configuration of the vehicle motion control system in the fifth embodiment is similar to the configuration of the vehicle motion control system 1 in the first embodiment except for the number of front watch points for calculation of the longitudinal acceleration command value.

Figure 30:
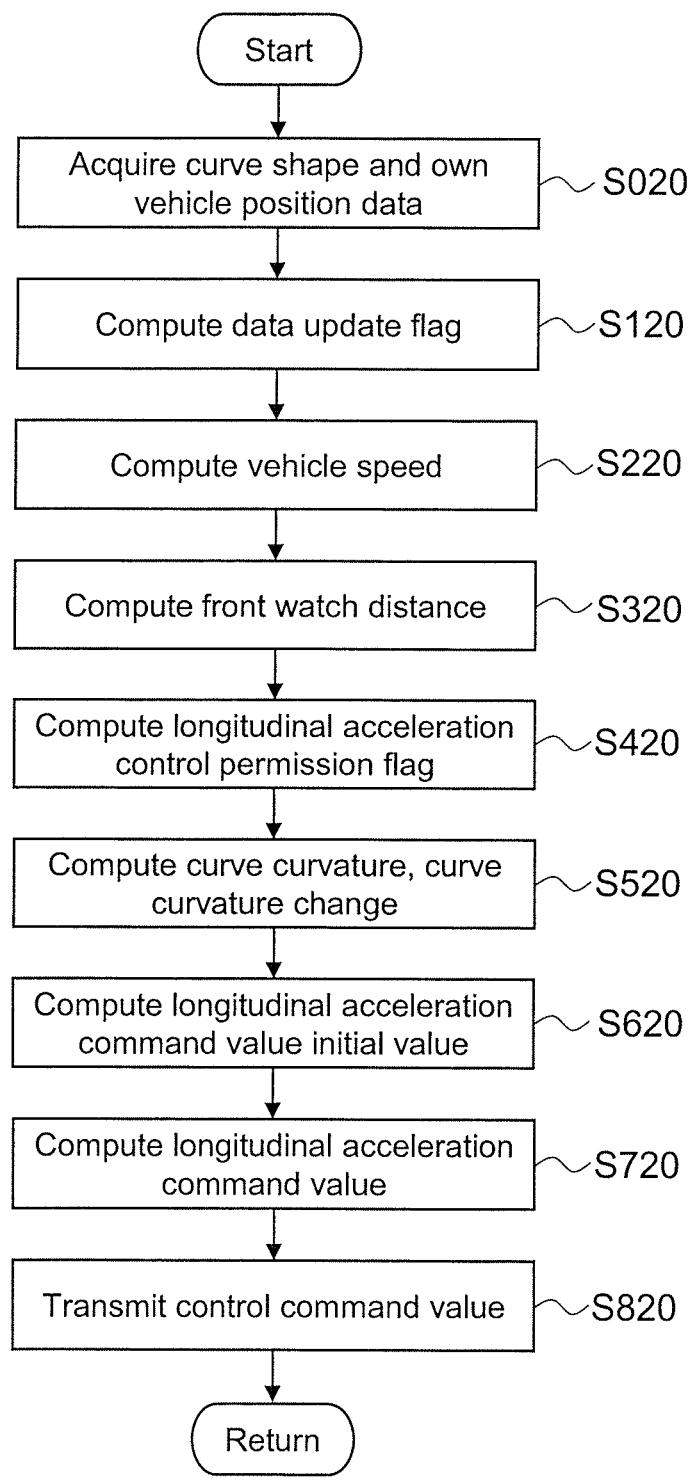
FIG. 30 is a flowchart showing a fifth embodiment of the vehicle motion control system according to the present invention.

FIG. 30 shows a calculation flowchart in the vehicle motion control system 1 according to the fifth embodiment.

In step S020, curve shape and own vehicle position data are acquired and calculated in the same way as in the first embodiment. After calculation, the procedure proceeds to step S120.

In step S120, it is determined whether or not the own vehicle position data $P_v$ ($X_v$, $Y_v$) by GPS is updated in the same way as in the first embodiment. If the data is updated, a data update flag $F_{GPSref}$ is set to 1. If not, the data update flag $F_{GPSref}$ is set to 0. After calculation, the procedure proceeds to step S220.

In step S220, a vehicle speed is computed from a temporal change of the own vehicle position also in the same way as in the first embodiment. After calculation, the procedure proceeds to step S320.

Figure 31:
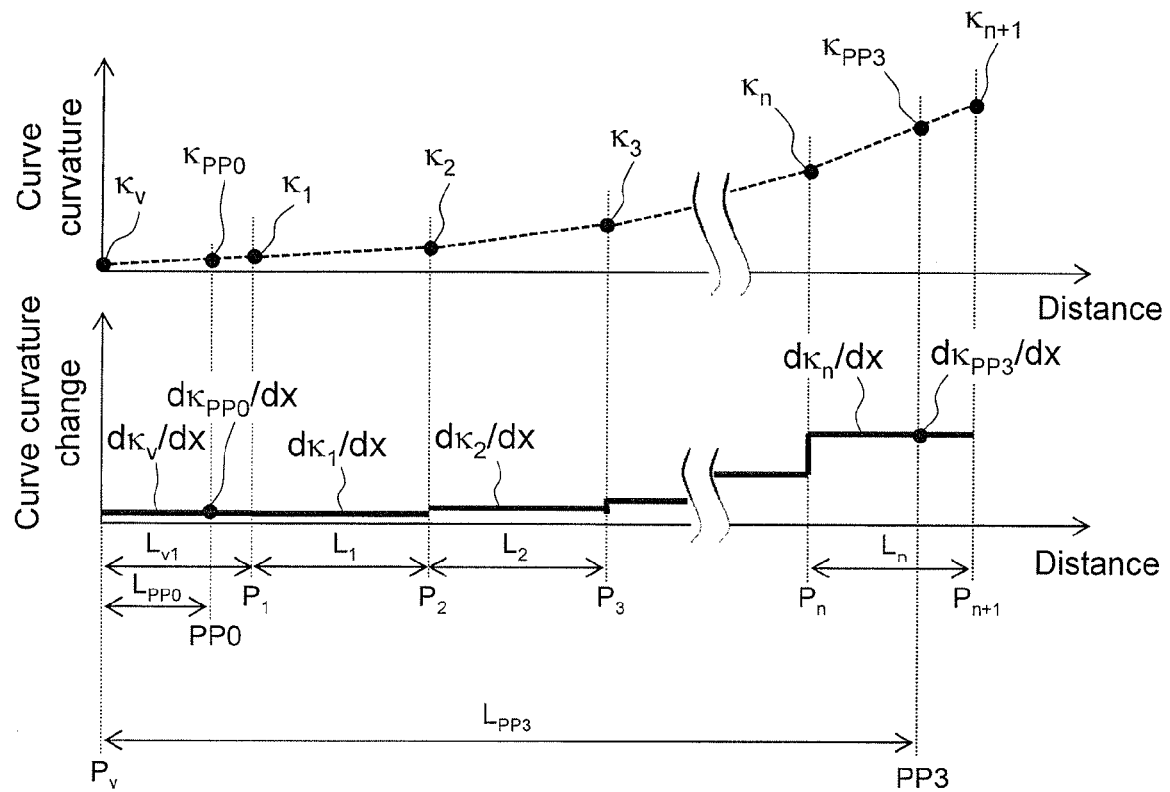
FIG. 31 is a relation view showing a curve curvature and a curve curvature change in the fifth embodiment of the vehicle motion control system according to the present invention.

In step S320, front watch distances are calculated. As shown in FIG. 31, two front watch points PP0, PP3 are set on the course in the travelling direction of the own vehicle at positions ranging from a position extremely near the own vehicle to a position distanced from the own vehicle, and front watch distances $L_{PP0}$ and $L_{PP3}$ from the own vehicle to the front watch points PP0 and PP3 are computed.

The front watch distances $L_{PP0}$ and $L_{PP3}$ are given by the Formula (33) with use of the front watch time $T_{PP0}$ and $T_{PP3}$ (provided that $T_{PP0} < T_{PP3}$), the vehicle speed V and the movement speeds of the front watch points $V_{PP0}$ and $V_{PP3}$.

$$\begin{cases} L_{PPk} = \min(T_{PPk} \cdot V, L_{PPk\_z1} + (V_{PPk} - V) \cdot \Delta t) & (\kappa_{PPk\_z1} > 0) \\ L_{PPk} = T_{PPk} \cdot V & (\kappa_{PPk\_z1} = 0) \quad (k = 0, 3) \end{cases} \quad (33)$$

In this formula, $L_{PP0\_z1}$ and $L_{PP3\_z1}$ represent previous values of the front watch distances $L_{PP0}$ and $L_{PP3}$, $\kappa_{PP0\_z1}$ and $\kappa_{PP3\_z1}$ represent previous values of the curve curvatures $\kappa_{PP0}$ and $\kappa_{PP3}$, $\Delta t$ represents unit step time of calculation, and min (A, B) represents a function for selecting either smaller one of A or B. The movement speeds $V_{PP0}$ and $V_{PP3}$ of the front watch points are given by the following Formula (34) with use of a vehicle longitudinal acceleration G, produced by differentiating the vehicle speed V and movement speed limit values $V_{PPlmt0}$ and $V_{PPlmt3}$ of the front watch points. When the system is structured to have a means to obtain a longitudinal acceleration through communication with other controllers or through direct measurement with an acceleration sensor, the longitudinal acceleration $G_x$ may be created from the longitudinal acceleration obtained by that means.

Figure 32:
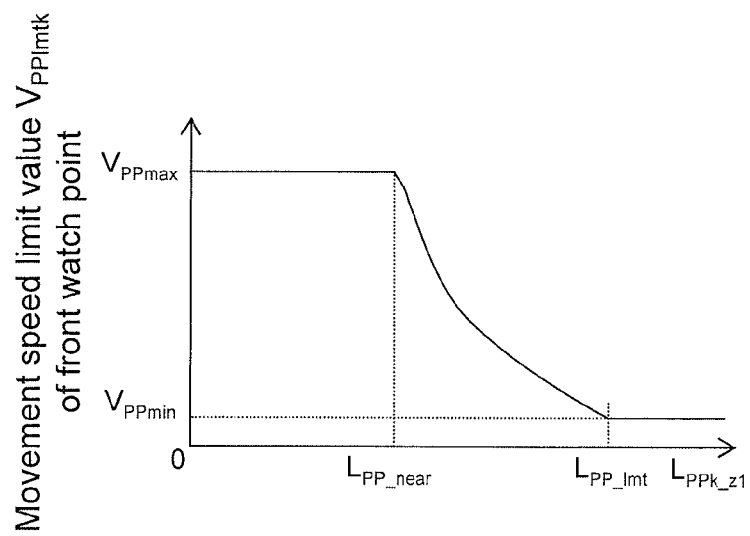
FIG. 32 is a view showing the relation between a distance to a front watch point and a movement speed of the front watch point in the fifth embodiment of the vehicle motion control system according to the present invention.

The movement speed limit values $V_{PPlmt0}$ and $V_{PPlmt3}$ of the front watch points are values preset based on previous values of the front watch distances $L_{PP0\_z1}$ and $L_{PP3\_z1}$. As shown in FIG. 32, if $L_{PP0\_z1}$ and $L_{PP3\_z1}$ are smaller than $L_{PP\_near}$, the movement speed limit values $V_{PPlmt0}$ and $V_{PPlmt3}$ may be set to be $V_{PPmax}$. If $L_{PP0\_z1}$ and $L_{PP3\_z1}$ are in the range from $L_{PP\_near}$ to $L_{PP\_lmt}$, $V_{PPlmt0}$ and $V_{PPlmt3}$ may be decreased in the foam of a downward convex curve in response to the increase in $L_{PP0\_z1}$ and $L_{PP3\_z1}$. If $L_{PP0\_z1}$ and $L_{PP3\_z1}$ are larger than $L_{PP\_lmt}$, $V_{PPlmt0}$ and $V_{PPlmt3}$ may be set to be $V_{PPmin}$.

Figure 33:
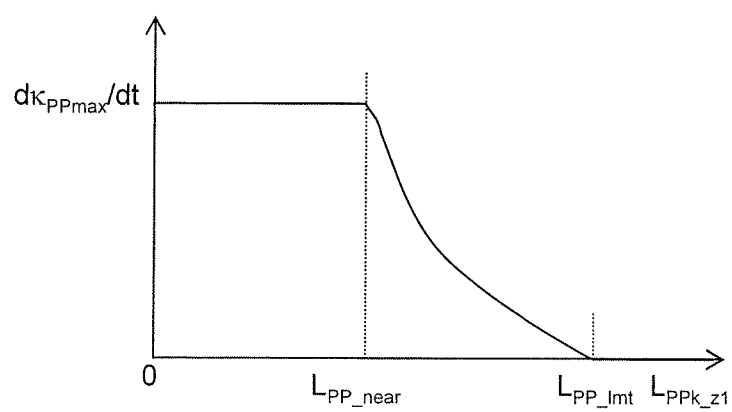
FIG. 33 is a view showing the relation between a distance to a front watch point and a temporal change limit value of the curve curvature at a front watch point position in the fifth embodiment of the vehicle motion control system according to the present invention.

As shown in FIG. 33, curve curvature temporal change limit values $d\kappa_{PPlmt0}/dt$ and $d\kappa_{PPlmt3}/dt$ at the positions of front watch points may be set to be $d\kappa_{PPmax}/dt$ if $L_{PP0\_z1}$ and $L_{PP3\_z1}$ are smaller than $L_{PP\_near}$. $L_{PP0\_z1}$ and $L_{PP3\_z1}$ are in the range from $L_{PP\_near}$ to $L_{PP\_lmt}$, $d\kappa_{PPlmt0}/dt$ and $d\kappa_{PPlmt3}/dt$ may be decreased in the form of a downward convex curve in response to the increase in $L_{PP0\_z1}$ and $L_{PP3\_z1}$. If $L_{PP0\_z1}$ and $L_{PP3\_z1}$ are larger than $L_{PP\_lmt}$, $d\kappa_{PPlmt0}/dt$ and $d\kappa_{PPlmt3}/dt$ may be set to 0. The movement speed limit values $V_{PPlmt0}$ and $V_{PPlmt3}$ of the front watch points may be given in the following Formula (35) with use of $d\kappa_{PPlmt0}/dt$ and $d\kappa_{PPlmt3}/dt$, and previous values of the curve curvature changes at the positions of the front watch points $d\kappa_{PP0\_z1}/dx$ and $d\kappa_{PP3\_z1}/dx$, respectively. After calculation, the procedure proceeds to step S420.

$$\begin{cases} V_{PPk} = \min(V + T_{PPk} \cdot G_x, V_{PPlmtk}) & (\kappa_{PPk\_z1} > 0) \\ V_{PPk} = V + T_{PPk} \cdot G & (\kappa_{PPk\_z1} = 0) \quad (k = 0, 3) \end{cases} \quad (34)$$

$$\begin{cases} V_{PPlmtk} = \dfrac{d\kappa_{PPlmtk}/dt}{d\kappa_{PPk\_z1}/dx} & (d\kappa_{PP0\_z1}/dx \neq 0) \\ V_{PPlmtk} = V_{PPmax} & (d\kappa_{PP0\_z1}/dx = 0) \quad (k = 0, 3) \end{cases} \quad (35)$$

In step S420, a longitudinal acceleration control permission flag is calculated in the same way as in the first embodiment. After calculation, the procedure proceeds to step S520.

In step S520, a curve curvature $\kappa_n$ at the positions of respective node points in which n in node point position data $P_n(X_n, Y_n)$ is 1 or more, a curve curvature $\kappa_v$ at the own vehicle position, and a curve curvature change $d\kappa_n/dx$ between node points are computed, and curve curvatures $\kappa_{PP0}$ and $\kappa_{PP3}$ and curve curvature change $d\kappa_{PP0}/dx$ and $d\kappa_{PP3}/dx$ in the front watch distances $L_{PP0}$ and $L_{PP}3$ are computed. To calculate the curve curvature, the curve curvature radius of a circular arc extending along successive three node points $P_{n-1}$, $P_n$ and $P_{n+1}$ may be obtained and then the reciprocal of the obtained curve curvature radius may be used to obtain a curve curvature $\kappa_n$ at the node point $P_n$.

After the curve curvature $\kappa_n$ and the curve curvature change $d\kappa_n/dx$ at each node point are computed as in the aforementioned first embodiment, the curve curvatures $\kappa_{PP0}$ and $\kappa_{PP3}$ and the curve curvature changes $d\kappa_{PP0}/dx$ and $d\kappa_{PP3}/dx$ corresponding to the front watch distances $L_{PP0}$ and $L_{PP}3$ are computed. For example, as shown in FIG. 31, when the front watch point PP0 is present between $P_v$ and $P_l$, and PP3 is present between $P_n$ and $P_{n+1}$, the curve curvatures $\kappa_{PP0}$ and $\kappa_{PP3}$, and the curve curvature changes $d\kappa_{PP0}/dx$ and $d\kappa_{PP3}/dx$ are given by the following Formulas (36) to (39).

$$\kappa_{PP0} = \kappa_V + \frac{d\kappa_V}{dx} \cdot L_{PP0} \quad (36)$$

$$\kappa_{PP3} = \kappa_n + \frac{d\kappa_n}{dx} \cdot \left\{ L_{PP3} - \left( L_{v1} + \sum_{j=1}^{n} L_j \right) \right\} \quad (37)$$

$$\frac{d\kappa_{PP0}}{dx} = \frac{d\kappa_V}{dx} \quad (38)$$

$$\frac{d\kappa_{PP3}}{dx} = \frac{d\kappa_n}{dx} \quad (39)$$

The methods for calculating the curve curvature $\kappa_n$ and the curve curvature change $d\kappa_n/dx$ at each node point are not limited to the methods described above. Any method can be adopted which can compute the curve curvature and the curve curvature change at each node point. After calculation, the procedure proceeds to step S620.

In step S620, as shown in aforementioned Formula (4), a longitudinal acceleration command value initial value is created based on the curve curvature temporal change in the front watch distances $L_{PP0}$ and $L_{PP3}$ and the vehicle speed V. As shown in the aforementioned Formula (5), the curve curvature temporal change at the front watch point can be expressed with the curve curvature change $d\kappa_{PP}/dx$ at the front watch point and the movement speed $V_{PP}$ of the front watch point. The longitudinal acceleration command value initial values $G_{xREQiniPP0}$ and $G_{xREQiniPP3}$ can be calculated by the following Formula (40) with use of the aforementioned Formulas (4) to (6) and (33) to (39).

$$G_{xREQiniPPm} = -C_{xym} \cdot \frac{d\kappa_{PPm}}{dx} \cdot V_{PPm} \cdot V^2 \quad (m = 0, 3) \quad (40)$$

In this formula, $C_{xy0}$ and $C_{xy3}$ are values obtained by integrating usable correction gains (e.g., correction gain $C_{adjGy}$ based on the maximum lateral acceleration estimate) among those shown in FIG. 6 to preset constants $C_{xy00}$ and $C_{xy30}$. The constants $C_{xy00}$ and $C_{xy30}$ may be values variable in accordance with other conditions. For example, values of the constants when $d\kappa_{PPm}/dx$ is positive may be different from values of the constants when $d\kappa_{PPm}/dx$ is negative. After calculation, the procedure proceeds to step S720.

In step S720, processing of longitudinal acceleration control with an intervention threshold, filtering, selection processing, summing processing and so forth are applied to the longitudinal acceleration command value initial values $G_{xREQiniPP0}$ and $G_{xREQiniPP3}$ to create a final longitudinal acceleration command value $G_{xREQfin}$. For example, filtering is applied to the longitudinal acceleration command value initial values $G_{xREQiniPP0}$ and $G_{xREQiniPP3}$ with a time constant set according to each sign and increase/decrease direction, and the selection processing and the summing processing are performed corresponding to the values obtained thereby.

Further, a longitudinal acceleration control intervention threshold on the side of deceleration is defined as $G_{xBRKs}$, a longitudinal acceleration control intervention threshold on the side of acceleration is defined as $G_{xACCs}$. With these intervention thresholds, processing of the longitudinal acceleration control is performed. The longitudinal acceleration control intervention thresholds $G_{xBRKs}$ and $G_{xACCs}$ are preset values.

In the area where both of the longitudinal acceleration command values $G_{xREQiniPP0}$ and $G_{xREQiniPP3}$ take a value other than 0 at the same time and if both of the command values have the same sign, then the command value having a larger absolute value is asserted, whereas if these command values have different signs, then respective values are added to have a final longitudinal acceleration command value. Consequently, it becomes possible to decrease the deceleration in the case where $G_{xREQiniPP0}$ is positive and $G_{xREQiniPP3}$ is negative, i.e., in the case where the curve curvature change at the position extremely near the own vehicle is negative and a curve is present ahead of the own vehicle which makes the curve curvature change positive. Therefore, a sensory acceleration at the time of traveling successive curves can be enhanced.

When adding is conducted, weighting may be applied in accordance with the sign. For example, to give priority to deceleration, a multiplier which diminishes a positive value may be integrated at the time of adding, whereas to give priority to acceleration, a multiplier which diminishes a negative value may be integrated at the time of adding.

Figure 34:
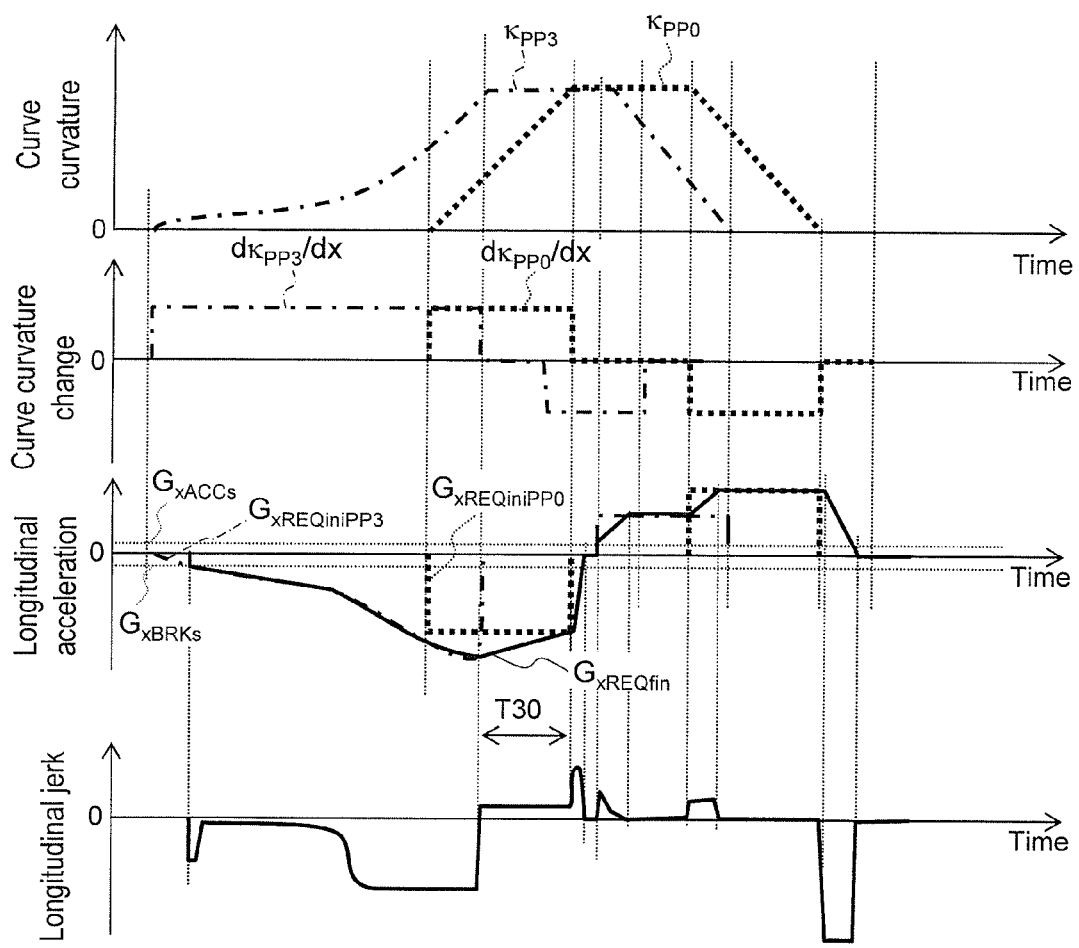
FIG. 34 is a view showing a temporal change of a curve curvature, a speed, a longitudinal acceleration and a longitudinal jerk in the fifth embodiment of the vehicle motion control system according to the present invention.

Consequently, when the vehicle travels a curve having the curve curvatures $\kappa_{PP0}$ and $\kappa_{PP3}$ and the curve curvature changes $d\kappa_{PP0}/dx$ and $d\kappa_{PP3}/dx$ as shown in FIG. 34, and $G_{xREQiniPP0}$ shown with a dotted line and $G_{xREQiniPP3}$ shown with a dashed dotted line are obtained, then a longitudinal acceleration command value $G_{xREQfin}$ as shown with a solid line is obtained. The longitudinal jerk in this case undergoes a change at the time of the first calculation of a negative longitudinal acceleration command value, and then again undergoes a change in a period from before entering into the curve to before the curve curvature reaching a maximum value. The method for creating $G_{xREQfin}$ from $G_{xREQiniPP0}$ and $G_{xREQiniPP3}$ is not limited to the method disclosed. It should be noted, however, that excessive negative longitudinal acceleration, i.e., excessive decrease in deceleration, should be prevented in a shift section from $G_{xREQiniPP3}$ to $G_{xREQiniPP0}$ shown with a reference sign T30 in FIG. 34. After calculation, the procedure proceeds to step S820.

In step S820, as in the first embodiment, if the longitudinal acceleration control permission flag is 1, a command value for implementing the longitudinal acceleration command value $G_{xREQfin}$ is transmitted to the longitudinal acceleration generation section 5. If the longitudinal acceleration control permission flag is 0, a command value for disabling longitudinal acceleration is transmitted thereto.

As for a signal transmitted when the longitudinal acceleration control permission flag is 1, the longitudinal acceleration command value $G_{xREQfin}$ is transmitted as a control command value in the case where the longitudinal acceleration command value $G_{xREQfin}$ is transmitted and the longitudinal acceleration generation section 5 can implement the received longitudinal acceleration command value $G_{xREQfin}$ as in the first embodiment.

As shown in the foregoing description, the movement speed of the front watch points is changed according to the distance to a curve. Accordingly, the deceleration can be increased in the vicinity of the curve where the driver starts to recognize the details of a temporal change of the curve curvature without conducting excessive deceleration at a distance from the curve where the driver is presumably unable to recognize the details of the temporal change of the curve curvature. As a result, the deceleration expected by the driver can be implemented and driving feeling of the driver can be enhanced. Further, since proportional gains are corrected with use of the maximum lateral acceleration estimate and other information including the accelerator operation by the driver, the road grade and the turning direction, driving feeling of the driver can be further enhanced. It is also possible to implement the fifth embodiment in the configuration of the aforementioned second to fourth embodiments.

It should be understood that the present invention is not limited to the first to fifth embodiments disclosed and various modifications are included therein. For example, the above-mentioned embodiments have been described in detail for easy understanding of the present invention. The present invention, therefore, is not necessarily limited to those including all the configuration members described therein. It should be also understood that a part of the configuration in one embodiment may be replaced with the configuration of other embodiments, and the configuration of one embodiment may be added to the configuration of other embodiments. Moreover, it is possible to delete and replace a part of the configuration of each of the first to fifth embodiments and to add other configurations thereto.

Each of the above-mentioned configurations, functions, processing sections, processing means and the like may be partly or entirely implemented as hardware by such method as designing them on an integrated circuit. Each of the above-mentioned configurations, functions and the like may be implemented as software in which software programs implementing respective functions are interpreted and executed by a processor. The information such as programs, tables and files for implementing each function may be stored in a storage device such as memories, hard disks, and SSDs (Solid State Drives), or stored in recording media such an IC cards, SD cards and DVDs.

The illustrated control lines and data lines are shown as needed for explanation, and do not necessarily represent all the control lines or data lines provided for a commercial product. It may be considered that in actuality, almost all the configurations are connected to each other.

DESCRIPTION OF SYMBOLS

1 Vehicle motion control system
2 Curve shape acquisition section
3 Own vehicle position acquisition section
4 Vehicle motion control calculation section
5 Longitudinal acceleration generation section
6 Vehicle motion information acquisition section
7 Driver-inputted information acquisition section 8 Lateral motion-associated longitudinal acceleration acquisition section
9 Road surface information acquisition section
10 Information presenter
11 Vehicle communication section
12 In-vehicle electronic controller
13 Setting information acquisition section
21 Correction gain calculation section (maximum lateral acceleration estimate)
22 Correction gain calculation section (road grade)
23 Correction gain calculation section (turning direction)
24 Correction gain calculation section (pedal operation amount)
25 Proportional gain calculation section

The invention claimed is:

1. A vehicle motion control system, comprising:
a curve shape acquisition section for acquiring a curve shape ahead of an own vehicle;
an own vehicle position acquisition section for acquiring a position of the own vehicle; and
a vehicle motion control calculation section for calculating a command value of a longitudinal acceleration generated for the vehicle based on the curve shape and the position of the own vehicle; wherein
with respect to the longitudinal acceleration command value having a travelling direction of the own vehicle as a positive value, the vehicle motion control calculation section calculates a negative longitudinal acceleration command value during travel of the own vehicle from before a curve to a point where a curve curvature becomes constant or maximum after the vehicle enters into the curve, and
the longitudinal acceleration command value is changed based on at least one out of:
an estimate of a maximum lateral acceleration which is calculated in advance by the vehicle motion control calculation section and which is presumably generated at a time of traveling a curve ahead of the own vehicle; a grade of a road ahead of the own vehicle; pedal operation by a driver; and a turning direction.

2. The vehicle motion control system according to claim 1, wherein the vehicle motion control calculation section calculates a plurality of different negative longitudinal acceleration command values.

3. The vehicle motion control system according to claim 1, wherein
the vehicle motion control calculation section calculates a negative longitudinal acceleration command value so that a longitudinal jerk that is a temporal change of the longitudinal acceleration is changed during a period of time, other than immediately after start of deceleration, from before entering into the curve to a point when a curve curvature becomes constant or maximum.

4. The vehicle motion control system according to claim 2, wherein
a plurality of the different longitudinal acceleration command values include a first longitudinal acceleration command value which generates a first deceleration of the own vehicle before the curve and then keeps the deceleration generally constant and a second longitudinal acceleration command value which changes a deceleration of the own vehicle which is generated before starting to enter into the curve so that the deceleration increases, and an absolute maximum of the first longitudinal acceleration command value is equal to or less than an absolute maximum of the second longitudinal acceleration command value.

5. The vehicle motion control system according to claim 3, wherein
in a period of time from before entering into the curve to a point when the curve curvature becomes constant or maximum, an absolute value of the negative longitudinal acceleration command value increases more after change of the longitudinal jerk that is a temporal change of the longitudinal acceleration than before the change of the longitudinal jerk.

6. The vehicle motion control system according to claim 1, wherein
the longitudinal acceleration command value before the curve differs with a temporal change of the curve curvature at the position of the own vehicle, and
when the temporal change of the curve curvature at the position of the own vehicle is negative, an absolute value of the longitudinal acceleration command value before the curve is set to be smaller as compared with a case where the temporal change of the curve curvature at the position of the own vehicle is 0 or more.

7. The vehicle motion control system according to claim 1, wherein
based on a temporal change of the curve curvature at a position away for a preset distance from the position of the own vehicle with the position of the own vehicle as an origin or away for a distance obtained from a product of a vehicle speed and a preset time, the vehicle motion control calculation section produces a decrease of the longitudinal acceleration command value which generates change in a longitudinal jerk that is a temporal change of the longitudinal acceleration.

8. The vehicle motion control system according to claim 1, wherein
the vehicle motion control calculation section produces a decrease of the longitudinal acceleration command value, which generates change in a longitudinal jerk that is a temporal change of the longitudinal acceleration, based on a curve curvature ahead of the own vehicle or a temporal change of the curve curvature and a vehicle speed.

9. The vehicle motion control system according to claim 1, wherein
the vehicle motion control calculation section includes:
an own vehicle speed computation section for computing speed of the own vehicle;
a front watch distance computation section for setting a plurality of preset front watch points on a course in a travelling direction of the own vehicle and computing front watch distances from the position of the own vehicle to the front watch points;
a curve curvature computation section for computing a curve curvature and a temporal change of the curve curvature in the front watch distance;
a proportional gain calculation section for calculating a proportional gain for changing the longitudinal acceleration command value based on at least one of the maximum lateral acceleration estimate, the grade of the road ahead of the own vehicle, the pedal operation by the driver, and the turning direction; and
a longitudinal acceleration command value calculation section for calculating the longitudinal acceleration command value based on the curve curvature and the temporal change of the curve curvature in the front watch distance, the vehicle speed, and the proportional gain.

10. The vehicle motion control system according to claim 1, comprising:
   a vehicle motion information acquisition section for acquiring at least one vehicle motion information out of a speed and a longitudinal acceleration of the own vehicle;
   a driver-inputted information acquisition section for acquiring a driver-requested longitudinal acceleration which is requested from the driver;
   a lateral motion-associated longitudinal acceleration acquisition section for acquiring a lateral motion-associated longitudinal acceleration based on a lateral jerk of the vehicle; and
   a road surface information acquisition section for acquiring road surface information on a road surface friction coefficient and on a surface vertical grade of a road surface on which the own vehicle travels, wherein
   the vehicle motion control calculation section calculates the longitudinal acceleration command value produced for the vehicle based on the curve shape, the position of the own vehicle, the vehicle motion information, the driver-requested longitudinal acceleration, the lateral motion-associated longitudinal acceleration, and the road surface information.

11. The vehicle motion control system according to claim 10, wherein
   the driver-inputted information acquisition section detects ON/OFF operation of a longitudinal acceleration control switch and outputs longitudinal acceleration control switch ON/OFF information, and
   the vehicle motion control calculation section includes:
   a front watch distance computation section for setting a plurality of preset front watch points on a course in a travelling direction of the own vehicle and computing front watch distances from the position of the own vehicle to the front watch points;
   a longitudinal acceleration control mode calculation section for calculating a longitudinal acceleration control mode based on the longitudinal acceleration control switch ON/OFF information, the speed of the own vehicle, the curve shape, the position of the own vehicle, and the lateral motion-associated longitudinal acceleration;
   a curve curvature computation section for computing a curve curvature and a temporal change of the curve curvature in the front watch distance based on the calculated longitudinal acceleration control mode;
   a proportional gain calculation section for calculating a proportional gain for changing the longitudinal acceleration command value based on at least one of the maximum lateral acceleration estimate, the grade of the road ahead of the own vehicle, the pedal operation by the driver, and the turning direction;
   a longitudinal acceleration command value calculation section for calculating the longitudinal acceleration command value based on the curve curvature and the temporal change of the curve curvature in the front watch distance, the vehicle speed, and the proportional gain; and
   a control command value output section for outputting a control command value for implementing the calculated longitudinal acceleration command value based on the calculated longitudinal acceleration control mode.

12. The vehicle motion control system according to claim 1, comprising;
   a vehicle communication section for communicating information between the vehicle motion control calculation section and an in-vehicle electronic controller outside the vehicle motion control system.

13. The vehicle motion control system according to claim 9, wherein
   the front watch point is set based on a distance obtained from a product of a vehicle speed and a preset front watch time, or a distance obtained by integrating a front watch point speed, the front watch point speed being either smaller one of a first front watch point speed obtained by adding the vehicle speed to the product of the longitudinal acceleration and the front watch time of the vehicle or a second front watch point speed created based on the curve curvature at a front watch point position and the front watch distance.

14. The vehicle motion control system according to claim 1, wherein the grade of the road is made of at least either a vertical grade or a horizontal grade.

15. The vehicle motion control system according to claim 11, wherein
   the front watch point is set based on a distance obtained from a product of a vehicle speed and a preset front watch time, or a distance obtained by integrating a front watch point speed, the front watch point speed being either smaller one of a first front watch point speed obtained by adding the vehicle speed to the product of the longitudinal acceleration and the front watch time of the vehicle or a second front watch point speed created based on the curve curvature at a front watch point position and the front watch distance.

* * * * *